United States Patent
Kim et al.

(10) Patent No.: US 10,437,607 B2
(45) Date of Patent: Oct. 8, 2019

(54) ELECTRONIC DEVICE AND APPLICATION CONTROL METHOD THEREOF

(71) Applicant: Samsung Electronics Co., Ltd., Gyeonggi-do (KR)

(72) Inventors: Byung Wook Kim, Gyeonggi-do (KR); Hee Deog Kim, Gyeonggi-do (KR); Moo Young Kim, Seoul (KR); Hak Ryoul Kim, Gyeonggi-do (KR); Jin Goo Lee, Seoul (KR); Rae Jin Uh, Seoul (KR); Ju Beam Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 12 days.

(21) Appl. No.: 15/056,190

(22) Filed: Feb. 29, 2016

(65) Prior Publication Data

US 2016/0253187 A1 Sep. 1, 2016

(30) Foreign Application Priority Data

Feb. 27, 2015 (KR) .................. 10-2015-0028645
Sep. 4, 2015 (KR) .................. 10-2015-0125851

(51) Int. Cl.
*G06F 9/445* (2018.01)
*G06F 1/3212* (2019.01)
(Continued)

(52) U.S. Cl.
CPC ........ *G06F 9/44505* (2013.01); *G06F 1/3212* (2013.01); *G06F 9/4893* (2013.01); *H04W 52/0258* (2013.01); *G06F 1/325* (2013.01); *G06F 1/3215* (2013.01); *Y02D 10/174* (2018.01); *Y02D 70/142* (2018.01); *Y02D 70/144* (2018.01); *Y02D 70/164* (2018.01);
(Continued)

(58) Field of Classification Search
CPC .. G06F 9/44505; G06F 1/3212; G06F 9/4893; G06F 1/3215; G06F 1/325; G06F 2009/45575; G06F 90/50; G06F 9/4406; G06F 9/4403; G06F 9/4418; G06F 21/51; H04W 52/0258; Y02B 60/50; Y02B 60/1292

See application file for complete search history.

(56) References Cited

U.S. PATENT DOCUMENTS 8,578,364 B2   11/2013  Schreier et al.
8,958,854 B1   2/2015   Morley et al.
(Continued)

OTHER PUBLICATIONS

Dan Gookin: "Android Phone Task Manager Functions", Android Phones for Dummies, XP055282307, Apr. 1, 2012, 2 pages.
(Continued)

*Primary Examiner* — S. Sough
*Assistant Examiner* — Phuong N Hoang
(74) *Attorney, Agent, or Firm* — The Farrell Law Firm, P.C.

(57) ABSTRACT

An electronic device and a method of application control by an electronic device are provided. The electronic device includes a memory configured to store a first application list including an application installed in the electronic device; and a processor configured to update the first application list according to at least one of an operation of the application, use history of the application, and a user request, and to limit the operation of the application.

22 Claims, 14 Drawing Sheets

(51) Int. Cl.
*G06F 9/48* (2006.01)
*H04W 52/02* (2009.01)
*G06F 1/3215* (2019.01)
*G06F 1/3234* (2019.01)

(52) U.S. Cl.
CPC .......... *Y02D 70/166* (2018.01); *Y02D 70/168* (2018.01); *Y02D 70/26* (2018.01)

(56) References Cited

U.S. PATENT DOCUMENTS

| | | | |
|---|---|---|---|
| 9,603,049 B2* | 3/2017 | Alisawi | H04W 76/10 |
| 2004/0128382 A1 | 7/2004 | Shimoda et al. | |
| 2005/0229226 A1* | 10/2005 | Relan | H04H 60/33 |
| | | | 725/114 |
| 2006/0148496 A1* | 7/2006 | Zhu | H04M 1/72552 |
| | | | 455/466 |
| 2008/0160979 A1* | 7/2008 | Huang | H04M 1/6016 |
| | | | 455/418 |
| 2009/0013087 A1* | 1/2009 | Lorch | H04M 1/72552 |
| | | | 709/232 |
| 2009/0271776 A1 | 10/2009 | Schreier et al. | |
| 2012/0198006 A1* | 8/2012 | Moayerzadeh Ahmadi | |
| | | | H04L 51/38 |
| | | | 709/206 |
| 2012/0221877 A1 | 8/2012 | Prabu | |
| 2012/0272230 A1 | 10/2012 | Lee | |
| 2014/0035853 A1* | 2/2014 | Ok | G06F 3/0416 |
| | | | 345/173 |
| 2014/0130032 A1 | 5/2014 | Lipinski et al. | |
| 2014/0137005 A1* | 5/2014 | Park | G06F 3/04842 |
| | | | 715/760 |
| 2014/0157387 A1 | 6/2014 | Lee et al. | |
| 2014/0281608 A1* | 9/2014 | Yin | G06F 1/3212 |
| | | | 713/320 |
| 2014/0365789 A1 | 12/2014 | Seo et al. | |
| 2015/0006638 A1 | 1/2015 | Jain et al. | |
| 2015/0067238 A1* | 3/2015 | Marcu | G06F 12/0246 |
| | | | 711/103 |
| 2015/0220127 A1* | 8/2015 | Kukoyi | H04W 52/0258 |
| | | | 713/340 |
| 2015/0301578 A1 | 10/2015 | Seo et al. | |
| 2016/0150072 A1* | 5/2016 | Rangarajan | H04W 4/003 |
| | | | 455/574 |
| 2017/0055208 A1* | 2/2017 | Chen | H04W 52/02 |

OTHER PUBLICATIONS

Andrew Kameka, "Google and Cyanogen Comments Imply Task Killer/Manager Apps are Pointless", XP055282479, May 7, 2010, 3 pages.
International Search Report dated Jun. 1, 2016 issued in counterpart application No. PCT/KR2016/001966, 12 pages.
European Search Report dated Jul. 4, 2016 issued in counterpart application No. 16157645.9-1959, 13 pages.

* cited by examiner

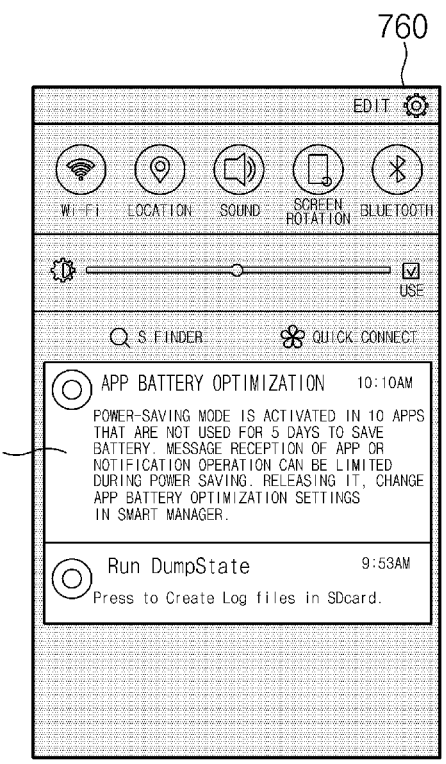
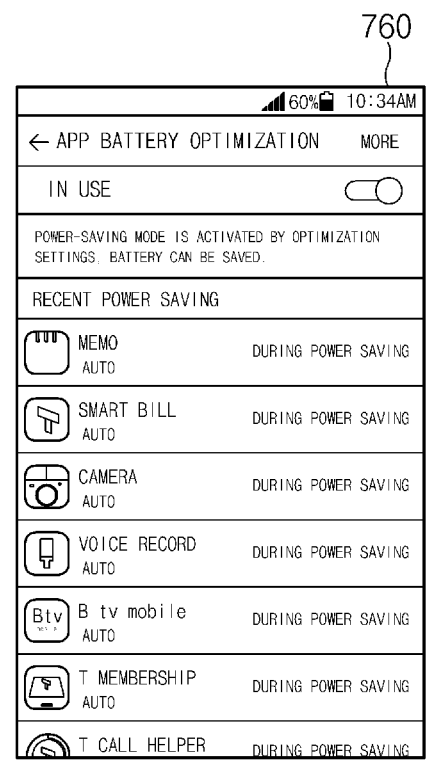
FIG. 7A
FIG. 7B

ELECTRONIC DEVICE AND APPLICATION CONTROL METHOD THEREOF

PRIORITY

This application claims priority under 35 U.S.C. § 119(a) to Korean Patent Applications Serial Nos. 10-2015-0028645 and 10-2015-0125851, which were filed in the Korean Intellectual Property Office on Feb. 27, 2015 and Sep. 4, 2015, respectively, the entire disclosure of each of which is incorporated herein by reference.

BACKGROUND

1. Field of the Disclosure

The present disclosure relates generally to a method and an apparatus for controlling operations of applications.

2. Description of the Related Art

Electronic devices use various applications. For example, applications, which are executable through electronic devices, may be executed in response to requests of users and may perform various instructions and functions. Applications may also be executed automatically or according to a predetermined condition.

Applications may perform various operations using resources provided through an electronic device, e.g., a power supply (e.g., a battery), a network, a memory, a processor, etc. Some applications may be executed as a background operation, i.e., where a screen associated with a corresponding application is not displayed.

Further, some applications are executed while the electronic device is in an inactivated state (e.g., a sleep state, a waiting state, a low-power operation state, etc.) or when a display of the electronic device is in an inactivated state.

SUMMARY

Aspects of the present disclosure are provided to address at least the above-mentioned problems and/or disadvantages and to provide at least the advantages described below.

Accordingly, an aspect of the present disclosure is to provide an apparatus and a method for performing a service and resource management of an electronic device by controlling an application, which is executed through the electronic device, according to various conditions.

In accordance with an aspect of the present disclosure, an electronic device is provided. The electronic device includes a memory configured to store a first application list including an application installed in the electronic device; and a processor configured to update the first application list according to at least one of an operation of the application, use history of the application, and a user request, and to limit the operation of the application.

In accordance with another aspect of the present disclosure, an application control method of an electronic device is provided. The application control method includes updating a first application list including an application installed in the electronic device, according to at least one of an operation of the application, use history of the application, and a user request; and limiting an operation of the application included in the first application list.

In accordance with another aspect of the present disclosure, an electronic device is provided. The electronic device includes a display; a processor; and a memory that stores instructions, which when executed, control the processor to refrain from performing a function of the electronic device associated with an operation of an application program, which is executable through the electronic device, while at least part of the display is inactivated, according to the operation of the application program.

In accordance with another aspect of the present disclosure, an electronic device is provided. The electronic device includes a display, a wireless communication circuit, a volatile memory, a processor; and a non-volatile memory that stores software implementing an operating system (OS) and instructions, which when executed, control the processor to load and execute at least part of the OS on the volatile memory, to load and execute an application, which interfaces with the OS, on the volatile memory, to monitor an operation of the executed application by an operation of part of the OS, and to unload at least part of the application from the volatile memory, when the display is turned off, according to at least part of the monitored result by the operation of part of the OS.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A and 7B illustrate user interfaces according to an embodiment of the present disclosure;

Throughout the drawings, it should be noted that like reference numbers are used to depict the same or similar elements, features, and structures.

DETAILED DESCRIPTION

Figure 1:
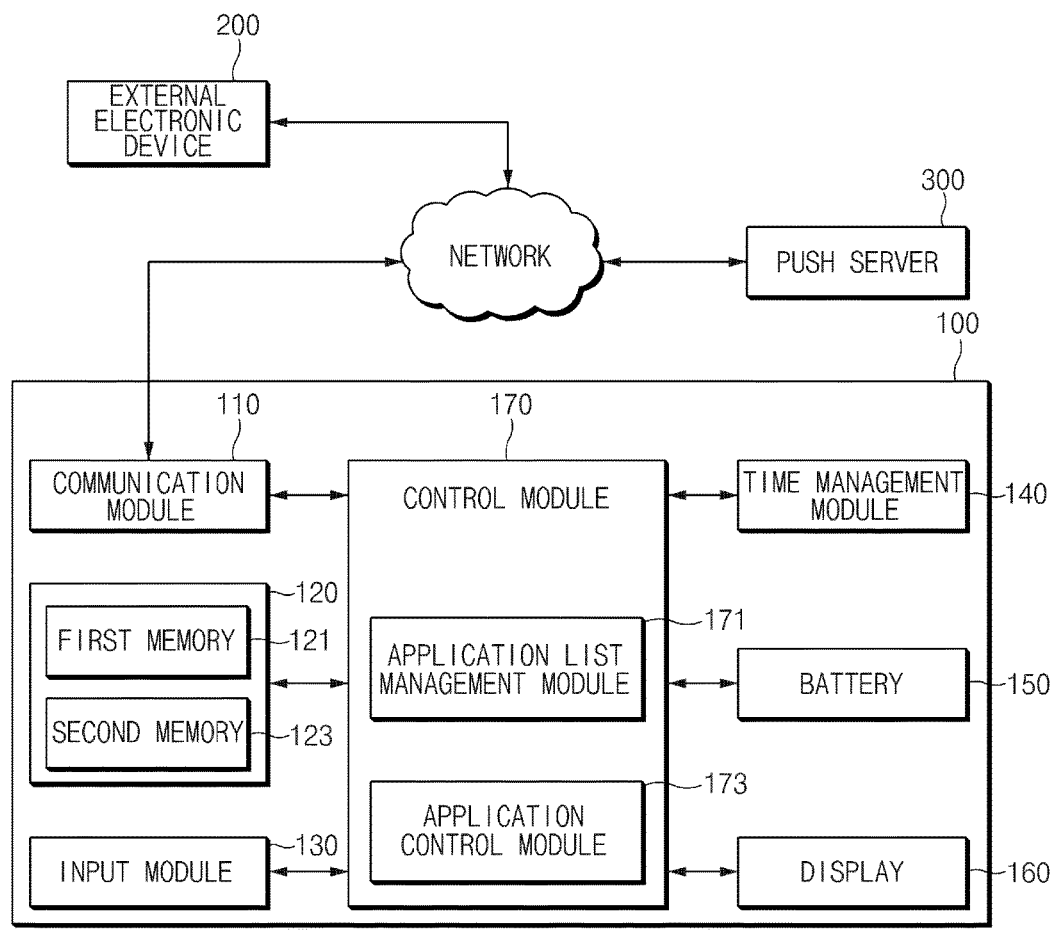
FIG. 1 illustrates an electronic device according to an embodiment of the present disclosure.

Hereinafter, various embodiment of the present disclosure are described with reference to the accompanying drawings. However, the present disclosure is not intended to be limited to the specific embodiments, and it is understood that it should include all modifications and/or, equivalents and substitutes within the scope and technical range of the present disclosure. For example, modifications are possible in various embodiments of the present disclosure and the embodiments are illustrated in the accompanying drawings and described in the related detailed descriptions.

Herein, the expressions "have", "may have", "include", "comprise", "may include", and "may comprise" indicate the existence of corresponding features (e.g., elements such as numeric values, functions, operations, or components) but do not exclude the presence of additional features.

Further, the expressions "A or B", "at least one of A or/and B", "one or more of A or/and B", etc., may include any and all combinations of one or more of the associated listed items. For example, the term "A or B", "at least one of A and B", and "at least one of A or B" may refer to (1) where at least one A is included, (2) where at least one B is included, or (3) where both of at least one A and at least one B are included.

Expressions such as "1st", "2nd", "first", "second", etc., may refer to various elements irrespective of the order and/or priority of the corresponding elements, but do not limit the corresponding elements. These types of expressions may be used to distinguish one element from another element. For instance, both "a first user device" and "a second user device" indicate different user devices from each other, irrespective of the order and/or priority of the corresponding elements. For example, a first component may be referred to as a second component and vice versa, without departing from the scope of the present disclosure.

When an element (e.g., a first element) is referred to as being "(operatively or communicatively) coupled with/to" or "connected to" another element (e.g., a second element), the first element can be directly coupled with/to or connected to the second element or an intervening element (e.g., a third element) may be present therebetween. However, when the first element is referred to as being "directly coupled with/to" or "directly connected to" the second element, then no intervening elements may be present therebetween.

Depending on the situation, the expression "configured to" used herein may be used as, for example, "suitable for", "having the capacity to", "designed to", "adapted to", "made to", or "capable of". The term "configured to" does not mean only "specifically designed to" using hardware. Instead, the expression "a device configured to" may mean that the device is "capable of" operating together with another device or other components. For example, a "processor configured to perform A, B, and C" may indicate a generic-purpose processor (e.g., a central processing unit (CPU) or an application processor), which may perform corresponding operations by executing one or more software programs, that may include a dedicated processor (e.g., an embedded processor) for performing a corresponding operation.

The terms of a singular form may include plural forms unless otherwise specified. Unless otherwise defined herein, all the terms used herein, which include technical or scientific terms, may have the same meanings as generally understood by a person skilled in the art. Further, terms that are defined in a dictionary and commonly used should be interpreted as is customary in the relevant related art and should not be interpreted in an idealized or overly formal way unless expressly so defined herein. In some cases, even if terms are defined in the specification, the defined terms are not to be interpreted to exclude embodiments of the present disclosure.

An electronic device according to an embodiment of the present disclosure may include a smart phone, a tablet personal computer (PC), a mobile phone, a video telephone, an electronic book reader, a desktop PC, a laptop PC, a notebook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. Examples of wearable devices may include an accessory-type wearable device (e.g., a watch, a ring, a bracelet, an anklet, a necklace, glasses, contact lenses, or a head-mounted-device (HMD)), a fabric or clothing integral wearable device (e.g., electronic clothes), a body-mounted wearable device (e.g., a skin pad or a tattoo), or an implantable wearable device (e.g., an implantable circuit).

An electronic device may also be a smart home appliance, such as a television (TV), a digital versatile disk (DVD) player, an audio device, a refrigerator, an air conditioner, a cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, or an electronic picture frame.

Further, an electronic device may include a medical device (e.g., various portable medical measurement devices (e.g., a blood glucose meter, a heart rate meter, a blood pressure meter, a thermometer, etc.), a magnetic resonance angiography (MRA) device, a magnetic resonance imaging (MRI) device, a computed tomography (CT) device, a scanner, an ultrasonic device, etc.), a navigation device, a global navigation satellite system (GNSS), an event data recorder (EDR), a flight data recorder (FDR), a vehicle infotainment device, electronic equipment for a vessel (e.g., a navigation system, a gyrocompass, etc.), an avionics device, a security device, a head unit for a vehicle, an industrial or home robot, an automatic teller machine (ATM), a point of sale (POS) device, or an Internet of Things (IoT) device (e.g., a light bulb, various sensors, an electric or gas meter, a sprinkler device, a fire alarm, a thermostat, a street lamp, a toaster, exercise equipment, a hot water tank, a heater, a boiler, etc.).

An electronic device may also include parts of furniture, buildings/structures, electronic boards, electronic signature receiving devices, projectors, or various measuring instruments (e.g., water meters, electricity meters, gas meters, wave meters, etc.).

The electronic devices according to various embodiments of the present disclosure may be flexible electronic devices.

Additionally, an electronic device may be a combination of one or more of the above-mentioned devices.

Further, an electronic device according to an embodiment of the present disclosure is not limited to the above-mentioned devices, and may include a new electronic device according to the development of new technologies.

Herein, the term "user" may refer to a person who uses an electronic device or may refer to a device (e.g., an artificial intelligence electronic device) that uses an electronic device.

FIG. 1 illustrates an electronic device according to an embodiment of the present disclosure.

Referring to FIG. 1, an electronic device 100 includes a communication module 110, a memory 120, an input module 130, a time management module 140, a battery 150, a display 160, and a control module 170.

The communication module 110 may communicate with an external electronic device 200 or a push server 300. For example, the communication module 110 may include a radio frequency (RF) module, a cellular module, a wireless-fidelity (Wi-Fi) module, a Bluetooth module, a global positioning system (GPS) module (or a GNSS module), or a near field communication (NFC) module. The electronic device 100 may connect to, for example, a network (e.g., an internet network or a mobile communication network) through at least one of the above-mentioned modules and may communicate with the external electronic device 200 through the network. Alternatively, the electronic device 100 may directly connect and communicate with the external electronic device 200.

The communication module 110 may communicate with the push server 300.

The push server 300 provides a push service. For example, the push service may refer to an information transmission service in which the push server 300 initiates a request for transmitting information. For example, although there is no request by a client device (e.g., the electronic device 100), the push server 300 may transmit predetermined data to the client device. The client device may process received data through, for example, an application or may provide (e.g., display) the received data to a user.

If an application uses the push service, the communication module 110 may register information about the application or the electronic device 100 in the push server 300 under a control of the control module 170. For example, the communication module 110 may transmit user identification information (or device identification information) to the push server 300. After receiving the user identification information, the push server 300 may generate registration information (e.g., a registration identifier (ID)) about a push service according to the received user identification information and may transmit the generated registration information to the electronic device 100. If the information about the application or the electronic device 100 is registered in the push server 300, the communication module 110 may receive push data associated with various applications from the push server 300.

The memory 120 may store instructions or data associated with at least another component included in the electronic device 100. The memory 120 includes a first memory 121 and a second memory 123. For example, the first memory 121 may be a volatile memory (e.g., a random access memory (RAM)). The first memory 121 may store instructions or data associated with an operation of an application. For example, if a specific application is executed, the first memory 121 may temporarily store some (e.g., data associated with the execution of the application) of data of the executed application.

The second memory 123 may be a non-volatile memory (e.g., a flash memory, a secure digital (SD) card, etc.). The second memory 123 may store software or a program. For example, the second memory 123 may store a kernel, a middleware, an application programming interface (API), or an application (or an application program).

The second memory 123 may store an application list that includes at least some of the applications installed in the electronic device 100 (or that may be executed by the electronic device 100). The application list stored in the second memory 123 may be updated, e.g., when a new application is added to the application list or is deleted from the application list. Properties of an application included in the application list may be changed.

TABLE 1

| Application | Type | Last execution | Notification check | State |
|---|---|---|---|---|
| facebook ® | push service periodic-timer | 2015.01.25 21:05 | 100% | normal |

TABLE 1-continued

| Application | Type | Last execution | Notification check | State |
|---|---|---|---|---|
| hangouts ® | non-periodic timer | 2014.12.25 15:23 | 20% | frozen |
| chatON | push service | 2015.02.04 09:46 | 80% | Semi-frozen |

Table 1 illustrates an example of an application list. Referring to Table 1, the application list includes an application name item (e.g., Application), an application operation type item (e.g., Type), a last execution item (e.g., Last execution), a notification check item (e.g., Notification check), and an application state item (e.g., State).

The application operation type item may include information about whether an application uses a push service and/or information about whether the application periodically or non-periodically performs a predetermined operation.

The application may set a timer and perform a predetermined operation after a time elapses. For example, an application that periodically performs a predetermined operation may have periodic timer properties. As another example, an application that non-periodically performs a predetermined operation may have non-periodic timer properties.

The notification check item may indicate whether a user, another application, or an external electronic device responds to notification associated with the application. The notification check item may include information about a probability that the user will verify notification. The notification check item may include information about a time taken until the user responds to notification associated with the application. The notification check item may include information about a location (e.g., a home, an office, etc.) where the user responds to notification associated with the application, and/or a date and time (e.g., a day and a time) when the user responds to notification associated with the application.

The application state item may classify and indicate an operation state of a current application into at least one or more operation states. For example, the application state item may include information about whether the current application is permitted to operate or is limited in its operation and/or information about whether an application is in a 'normal' state, a 'frozen' state, and a 'semi-frozen' state. The 'normal' state may be a state in which the application is permitted to operate. The 'frozen' state may be a state in which the application is prohibited in at least some of operations of the application. The 'semi-frozen' state may be a state in which the application is not prohibited in its operation, but where an operation period is delayed or the number of operations is reduced. An application may be prohibited from being executed, except in response to a request from the user in the 'frozen' state.

The application state item may be determined when the application is registered in an application list. For example, if the application is registered in the application list, the application may be determined as one of the 'normal' state, the 'semi-frozen' state, and the 'frozen' state.

A predetermined event for the application registered in the application list may occur or the application may be changed to another state by a user request.

Referring again to FIG. 1, the input module 130 may receive an instruction from the user or another external device. The input module 130 may include a touch sensor panel that senses a touch operation of the user and/or a pen sensor panel (e.g., a digitizer) that senses a pen operation of the user. The input module 130 may include a motion sensor that recognizes motion of the user and/or a voice sensor that recognizes a voice of the user.

The input module 130 may receive a user instruction for selecting whether to use a function that limits an operation of an application. The input module 130 may receive a user instruction for adding a specific application on an application list or deleting a specific application from the application list. The input module 130 may receive a condition (or reference settings) for limiting an operation of an application included in the application list. For example, the condition may include at least one of a position of the electronic device 100, a time, a user, a remaining capacity of the battery 150, a rate of consumption of the battery 150, or wireless communication usage (e.g., cellular data usage).

The time management module 140 may manage time information. For example, the time management module 140 may count a time and store information about a year/month/day/hour/minute/second in the memory 120. The time management module 140 may include a real time clock (RTC) circuit.

The time management module 140 may set a timer. For example, the time management module 140 may periodically or non-periodically set the timer according to a request of an application. If a predetermined time is reached, the time management module 140 may inform the control module 170 that the timer has expired. If the predetermined time is reached, the control module 170 may control an operation of an application associated with the corresponding timer.

The battery 150 may supply power to the electronic device 100 and/or supply power to each component included in the electronic device 100 to perform a function.

The display 160 may display a user interface. For example, the display 160 may display a user interface for adding a specific application to an application list or deleting the specific application from the application list. The user may add at least one or more applications to the application list or delete at least one or more applications from the application list, through the user interface displayed on the display 160.

The display 160 may display a user interface for changing states of applications included in the application list. For example, the user may change a state of a specific application from a 'normal' state to a 'frozen' state, may change the state of the specific application from the 'frozen' state to the 'normal' state, or may change the state of the specific application from the 'normal' state to a 'semi-frozen' state, through a user interface displayed on the display 160.

The display 160 may display a user interface that includes information about at least some of applications included in the application list. For example, the user interface may include a rate of consumption of the battery 150 by an application or an amount of the battery 150 consumed by the application.

The application may be limited in its operation.

The display 160 may display an icon of an application installed in the electronic device 100. The application icon may be changed and displayed according to whether an operation of the application is being limited.

The control module 170 may control an overall operation of the electronic device 100. For example, the control module 170 may control each of the communication module 110, the memory 120, the input module 130, the time management module 140, the battery 150, and the display 160 to control an operation of an application.

The control module 170 may include at least one processor. The control module 170 (e.g., an application processor) may be implemented with a system on chip (SoC) including a CPU, a graphic processing unit (GPU), a memory, etc.

The control module 170 may include an active mode (or a wake-up mode) and an inactive mode (or a sleep mode). In the active mode, the control module 170 executes an application or performs a specific operation by an executing application or a state where the control module 170 may perform the specific operation. The control module 170 may execute an application in the active mode and may provide various services, such as a social network service (SNS), an instant message service, and a game service, to the user.

In the sleep mode, the control module 170 does not perform any operation or may not perform any operation.

If a specific condition is met in the active mode, the control module 170 may enter the sleep mode. For example, if a user instruction is not input by the user during a predetermined time, the control module 170 may enter the sleep mode. The control module 170 may inactivate the display 160 (e.g., may turn off the power supply of the display 160) before entering the sleep mode and may enter the sleep mode.

The control module 170 may recognize a trigger signal for entering from the sleep mode to the active mode. If the trigger signal for entering from the sleep mode to the active mode is received, the control module 170 may enter the active mode and may perform an operation. For example, if a touch on a touch sensor panel, a hardware key input, an output from a predetermined sensor, voice recognition of a specific word, and/or a gesture (motion) of a specific pattern is input in the sleep mode, the control module 170 may enter the active mode and may perform an operation according to a user instruction.

Various embodiments of the present disclosure, which are described herein with reference to the sleep mode as an example, may also be performed in a state where the display 160 is inactivated or other modes (e.g., a hibernation mode) in which an electronic device (e.g., the electronic device 100) operates at low power.

When the control module 170 is in the sleep mode, an application may request the control module 170 to perform a specific operation. Therefore, the control module 170 may operate in the active mode to perform the operation requested by the application. If the corresponding operation is completed, the control module 170 may operate again in the sleep mode.

If the control module 170 is in the sleep mode, wakes up in response to a request of the application, and performs an operation, there may be a moment when an amount of current consumed is temporarily increased. Operations requested by the application may include an unnecessary or selective operation as well as an essential operation for executing the application. For example, despite receiving data through the push server 300, a messaging application may transmit a keep alive message to an application server and may maintain a connection with the application server. Alternatively, an application using location information may set a timer in the time management module 140, may periodically verify a position of the electronic device 100, and may transmit the verified position to the application server.

If the control module 170 does not consistently or sufficiently maintain a sleep mode state due to an unnecessary or selective operation of an application, an amount of the battery 150 consumed by the application may be considerably increased. Particularly, when more applications are installed in the electronic device 100, there are more possibilities that a wake-up operation of the control module 170 will occur frequently. Therefore, an available time of the battery 150 may be reduced.

The control module 170 may control an application to prevent the battery 150 from being consumed by the application due to an unnecessary or selective operation of the application in the sleep mode state.

The controlling of the application may include limiting (prohibiting or delaying) of at least some of operations of the application. Additionally, the limiting of the at least some of the operations may be maintained before a predetermined operation release event occurs (e.g., before an application is executed according to a user request) or before a request for releasing an operation limit is received from the user. For example, the operation limit may be maintained irrespective of the sleep mode or the active mode before the user requests the releasing of the operation limit.

The control module 170 may control the application according to inactivation of the display 160, irrespective of whether the control module 170 is in the sleep mode. Additionally, the control module 170 may control the application after a certain time elapses after the display 160 is activated.

The control module 170 includes an application list management module 171 and an application control module 173.

The application list management module 171 may generate and manage a list for applications corresponding to a predetermined condition among applications installed in the electronic device. The application list management module 171 may include an application, in which some functions may be performed through the electronic device, which is installed in another electronic device, in an application list.

The application list management module 171 may generate an application list and may store the generated application list in the memory 120. For example, the application list management module 171 may store the application list in a non-volatile memory (e.g., the second memory 123). Therefore, although the electronic device 100 is rebooted, the application list management module 171 may use an application list, stored before the electronic device 100 is rebooted, without change.

The application list management module 171 may generate an application list according to at least one of an operation of an application, use records of the application, or a user request and may store the generated application list in the memory 120.

The application list management module 171 may update an application list, which is stored in the memory 120, according to at least one of an operation of an application, use records of the application, or a user request. For example, the application list management module 171 may add a new application to an application list or may delete some of applications included in the application list. As another example, the application list management module 171 may change information (e.g., information included in an application operation type item, a last execution item, a notification check item, or an application state item) about an application registered in an application list.

The application list management module 171 may add an application, which performs a registration process to the push server 300, to an application list or may change a state of a previously added application.

If a push service is needed, the application may register, in the push server 300, information associated with the corresponding application or the electronic device 100. Although an application registered in the push server 300 is not executed or although the control module 170 is in the sleep mode, the application may receive data through the push server 300.

The application list management module 171 may add an application, which sets a timer in the time management module 140 to perform a predetermined operation, to an application list or may change a state of a previously added application. For example, the application list management module 171 may add an application, which sets a periodic timer (e.g., a timer repeated at intervals of a predetermined time) in the time management module 140, to an application list. As another example, the application list management module 171 may add an application, which sets a timer a predetermined number of times or more during a predetermined time in the time management module 140, to an application list.

The application list management module 171 may verify use records of an application may add an application, determined as not being used at a predetermined level or more (e.g., a predetermined number of times or more or a predetermined time or more) during a predetermined time, to an application list or may change a state of a previously added application.

The application list management module 171 may add an application, determined as not being used at a predetermined level or more during a predetermined time (e.g., five days, one week, or one month), to an application list.

The application list management module 171 may determine that an application is not used at a predetermined level or greater, in consideration of a state of the application. For example, the application list management module 171 may change a state of an application that is determined as not being used at a predetermined level or greater during a predetermined time (e.g., three days) in the 'normal' state, to the 'semi-frozen' state. Alternatively, the application list management module 171 may change a state of an application that is determined as not being used at a predetermined level or greater during a predetermined time (e.g., two days) in the 'semi-frozen' state, to the 'frozen' state.

The application list management module 171 may classify an operation of an application according to an operation form and may determine whether to use the application according to the classified operations. For example, the operation of the application may include a first operation performed while information (or an operation state of the application) corresponding to the operation of the application is displayed on the display 160, after the application is executed by the user, a second operation performed while the information corresponding to the operation of the application is not displayed on the display 160, and a third operation for providing information associated with the application to another application according to a request of the other application. If an operation is performed by the application, the application list management module 171 may determine whether the executed operation corresponds to any of the classified operations.

The application list management module 171 may accumulate a point corresponding to each operation and may determine that an application is used if the accumulated points reach a predetermined level. The application list management module 171 may set a predetermined level in a different way according to a type of an application.

The application list management module 171 may provide a different percentage (or a different weight value) to each operation and may determine whether to use an application. For example, the application list management module 171 may provide 0.8 (or 80%) to the first operation, 0.1 (or 10%) to the second operation, and 0.1 (or 10%) to the third operation.

The application list management module 171 may set a weight value provided to each operation in a different way according to a type of an application. For example, the application list management module 171 may provide a weight value of 0.8 to the first operation, 0.1 to the second operation, and 0.1 to the third operation with respect to a first application. The application list management module 171 may provide a weight value of 0.9 to the first operation, 0.1 to the second operation, and 0 to the third operation with respect to a second application. In other words, the application list management module 171 may not consider the third operation and may determine whether to use the second application.

Alternatively, application list management module 171 may provide a weight value of 1 to the first operation and 0 to the second operation and the third operation with respect to a third application. In other words, the application list management module 171 may determine whether to use the third application in consideration of only the first operation.

The application list management module 171 may determine whether the user verifies a notification associated with an application. For example, the application list management module 171 may determine a probability that the user will verify the notification associated with the application, and may add an application having a probability of a predetermined value or less to an application list or may change a state of a previously added application. The application list management module 171 may add an application having a probability of 20% or less (or 50% or less) to an application list. The application list management module 171 may change a state of the application having the probability of 50% or less, from the 'normal' state to the 'semi-frozen' state. The application list management module 171 may change a state of the application having the probability of 20% or less, from the 'semi-frozen' state to the 'frozen' state.

If a user response associated with notification is not received during a predetermined time (e.g., five days), the application list management module 171 may add a corresponding application to an application list or may change a state of a previously added application (e.g., may change the state from the 'normal' state to the 'frozen' state).

The application list management module 171 may delete an application, executed (or used) a predetermined number of times or more (e.g., seven times or more) during a predetermined time (e.g., one week), among applications included in an application list from the application list or may change a state of a previously added application (e.g., may change the state from the 'frozen' state or the 'semi-frozen' state to the 'normal' state).

The application list management module 171 may delete an application in which a probability that the user will verify the application is a predetermined value or more (e.g., 50% or more), from among the applications included in the application list from the application list or may change a state of a previously added application. For example, if the user responds to notification for an application included in the application list, the application list management module 171 may delete the corresponding application from the application list.

The application list management module 171 may add a specific application to the application list, may delete the specific application from the application list, or may change a state of an application included in the application list, according to a user request.

The application control module 173 may control operations of applications included in the application list.

If a predetermined event occurs (e.g., if a sleep mode is entered), the application control module 173 may limit (or prohibit or delay) at least some of operations performed by a corresponding application, with respect to at least one or more applications included in the application list.

The application control module 173 may limit at least some of operations performed by an application, according to a state of the application included in the application list. For example, the application control module 173 may limit an operation of an application of the 'frozen' state. Alternatively, the application control module 173 may delay an operation period of an application, which is in the 'semi-frozen' state, or may reduce the number of times the application operates.

If the control module 170 enters the sleep mode, the application control module 173 may limit (or ignore) at least some operations associated with an application having 'frozen' properties. For example, if a state of an application that sets a timer is designated as the 'frozen' properties, although a time set in the timer is reached while the control module 170 is in the sleep mode, the application control module 173 may control the application not to execute operations performed as the time set in the timer is reached. For example, the application control module 173 may limit an operation associated with communication among operations associated with the application having the 'frozen' properties. For example, the application control module 173 may wait, without immediately performing operations requested by an application having 'semi-frozen' properties, and may collectively process the operations every a predetermined period (e.g., 30 minutes).

The application control module 173 may control at least some of operations associated with communication with respect to an application registered in the application list. The communication may include long distance communication, such as cellular communication, and local-area communication, such as Wi-Fi communication or Bluetooth communication. For example, the application control module 173 may limit an operation using the communication module 110 when the control module 170 is in the sleep mode. For example, if a state of an application using a push service is designated as the 'frozen' properties, the application control module 173 may permit operations associated with the push service or an operation according to a user request and may limit the other operations after the control module 170 enters the sleep mode.

The application control module 173 may control at least some of operations associated with a sensor with respect to an application registered in the application list.

If there are other applications providing the same function as that of an application registered in the application list, the application control module 173 may limit an operation associated with at least one of the other applications. If an application that provides the same function as that of an application included in the application list is installed in the electronic device 100, the application control module 173 may limit the same operation as that of the application included in the application list among operations of the installed application.

If a predetermined time elapses after the control module 170 enters the sleep mode (or after the display 160 is turned off), the application control module 173 may limit an operation of an application included in the application list. For example, the application control module 173 may limit an operation of an application at the same time that the control module 170 enters the sleep mode (or to be almost simultaneous with the control module 170 entering the sleep mode).

Alternatively, if a predetermined time (e.g., about ten minutes) elapses after the control module 170 enters the sleep mode, the application control module 173 may limit an operation of an application included in the application list.

If the control module 170 enters the sleep mode (or if the display 160 is turned off), the application control module 173 may monitor an operation of an application. For example, after the control module 170 enters the sleep mode (or after the display 160 is turned off), the application control module 173 may verify whether an operation is performed by any application.

The application control module 173 may limit operations of other applications, except for an application that performs within a predetermined time after the electronic device 100 enters the sleep mode, among applications included in the application list.

Although FIG. 1 illustrates the application list management module 171 and the application control module 173 as being included in the control module 170 of the electronic device 100, the present disclosure is not limited thereto. For example, at least one of the application list management module 171 or the application control module 173 may be configured with a module or processor different from the control module 170 of the electronic device 100.

The electronic device 100 may connect and communicate with the external electronic device 200. The external electronic device 200 may be a wearable device.

If the electronic device 100 is connected with the external electronic device 200, the electronic device 100 may verify an application list (e.g., a second application list) of applications that may be executed in the external electronic device 200. For example, the electronic device 100 may receive the application list (e.g., the second application list) installed in the external electronic device 200 from the external electronic device 200.

The application control module 173 may compare an application list (e.g., a first application list) of the electronic device 100 with the application list (e.g., the second application) of the external electronic device 200 to identify the same applications therein. If the same application is in the first application list and the second application list, the application control module 173 may limit an operation of one of the applications installed in the electronic device 100 and the application installed in the external electronic device 200. For example, if the operation of the application installed in the external electronic device 200 is limited, the application control module 173 may control the communication module 110 to transmit a command for limiting an operation of a specific application to the external electronic device 200. Therefore, the other one of the applications installed in the electronic device 100 and the same application installed in the external electronic device 200 may operate normally.

The application control module 173 may compare the first application list of the electronic device 100 with the second application list of the external electronic device 200 to determine whether there is another application which provides the same function (or a similar function). For example, if applications that provide the same function are included in at least one of the first application list or the second application list, one of the electronic device 100 and the external electronic device 200 may limit at least some of operations associated with the corresponding applications.

The application control module 173 may select an electronic device to limit an operation of an application according to the remaining capacity of the battery 150 of the electronic device 100 and the remaining capacity of a battery of the external electronic device 200. For example, the application control module 173 may limit an operation of an application installed in an electronic device, in which the remaining capacity of the battery is low, between the electronic device 100 and the external electronic device 200. The application control module 173 may receive the remaining capacity of the battery of the external electronic device 200 from the external electronic device 200 through the communication module 110.

If at least one of the electronic device 100 or the external electronic device 200 connects to a power supply device (e.g., a wired or wireless charger), at least some of limited operations may then be permitted.

The application control module 173 may limit an operation of one of the applications installed in the electronic device 100 and the same application installed in the external electronic device 200, when the electronic device 100 connects with the external electronic device 200.

If the electronic device 100 connects with the external electronic device 200, the application control module 173 may limit an operation of one of the application installed in the electronic device 100 and the application installed in the external electronic device 200, irrespective of whether an event for limiting an operation of an application included in the first application list occurs. If the electronic device 100 disconnects from the external electronic device 200, the application control module 173 may limit an operation of the application included in the first application list according to whether an event for limiting an operation of an application included in the first application list occurs.

Figure 2A:
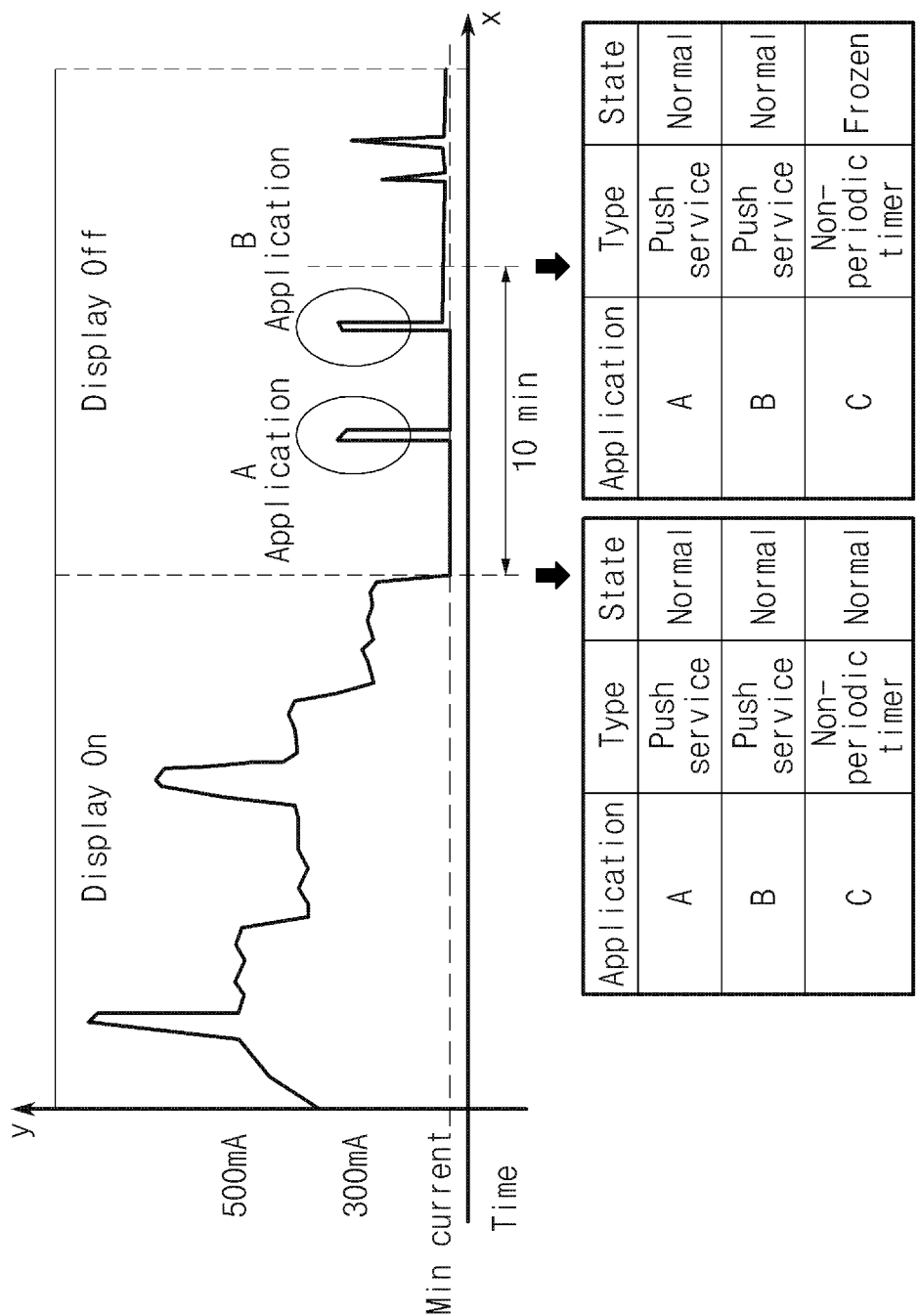
FIGS. 2A and 2B illustrate an example of limiting an operation of an application according to an embodiment of the present disclosure.
Figure 2B:
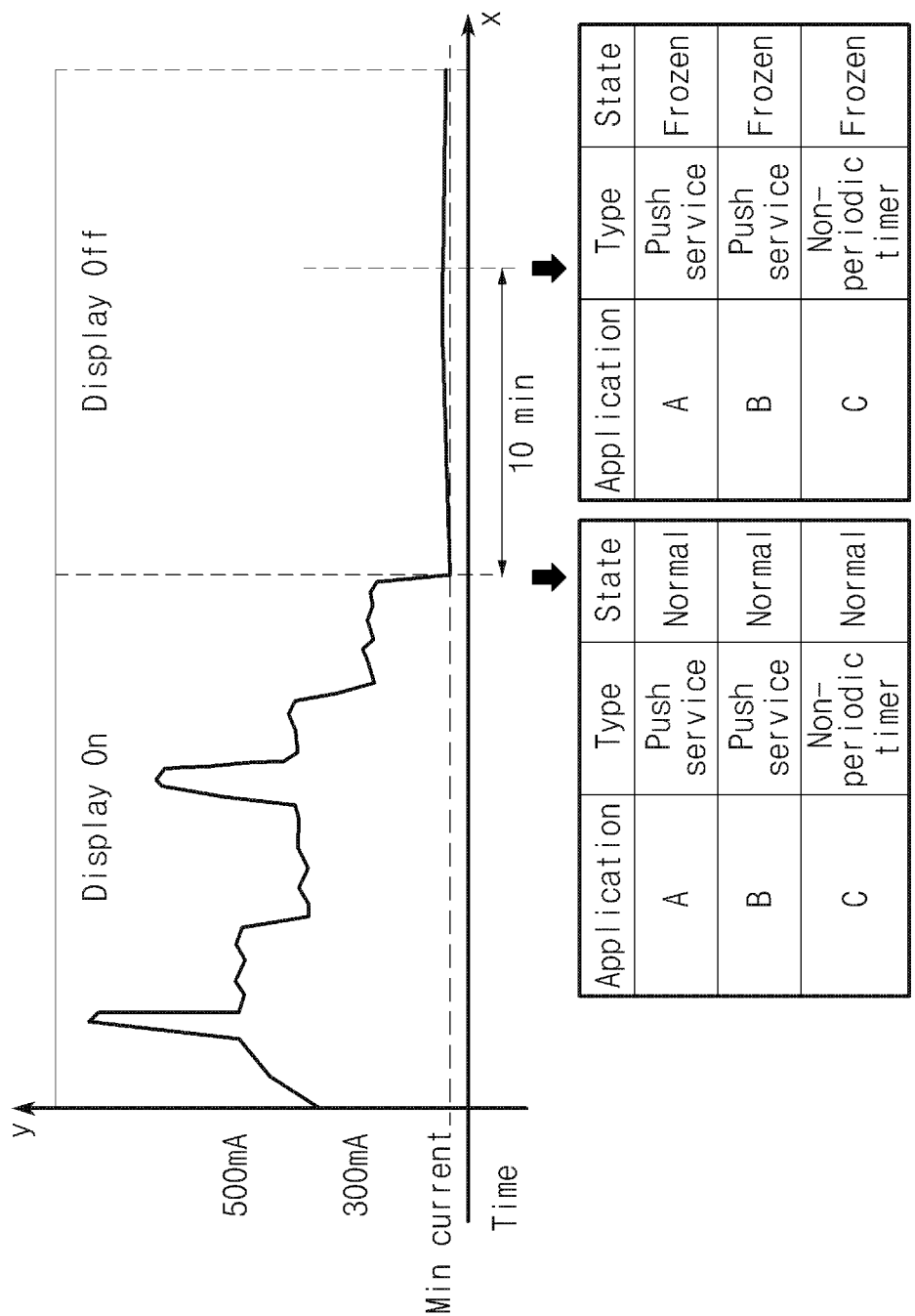

FIGS. 2A and 2B illustrate an example of limiting an operation of an application according to an embodiment of the present disclosure.

An x-axis of each of the graphs illustrated in FIGS. 2A and 2B denotes time and a y-axis denotes an amount of current consumed by an electronic device, e.g., the electronic device 100 of FIG. 1.

FIGS. 2A and 2B illustrate an amount of current consumed when a power supply (or a screen) of a display (e.g., the display 160 of FIG. 1) is turned on (or in an activated state) and an amount of current consumed when the power supply (or the screen) of the display is turned off (or in an inactivated state).

If the electronic device enters an inactivated state or a control module (e.g., the control module 170 of FIG. 1) enters a sleep mode, the display may be inactivated (e.g., the screen of the display may be turned off).

For example, if a predetermined time elapses before or after the control module enters the sleep mode, the control module may inactivate the display (e.g., may turn off the power supply or the screen of the display).

The control module may enter the sleep mode, may periodically or intermittently change to a wake-up mode, may perform a predetermined operation, and may return to the sleep mode. In this case, the display may maintain the inactivated state.

After an application control module wakes up, while the power supply of the display is turned off, by a request of an application, if the application performs an operation, an amount of current consumed by the application may be temporarily increased. For example, the application control module may verify whether an operation is performed by any application during a predetermined time, after the control module enters the sleep mode.

Referring to FIG. 2A, operations associated with an application A and an application B are performed during a ten minute interval, after the power supply of the display is turned off (or after the control module enters the sleep mode). Therefore, an application list management module may designate, for example, states of the applications A and B as a 'normal' state and may designate a state of an application C as a 'frozen' state. The application control module may limit an operation of the application C during the sleep mode, among the applications A, B, and C included in an application list. If receiving a request for an operation associated with the applications A and B having 'normal' properties, the application control module may change from the sleep mode to a wake-up mode, may perform the operation associated with the applications A and B, and may return to the sleep mode thereafter.

Referring to FIG. 2B, no operation is performed by an application during the ten minute interval, after the power supply of the display is turned off (or after the control module enters the sleep mode). Therefore, the application list management module may designate, for example, states of the applications A to C as the 'frozen' state. The application control module may limit operations of the applications A to C included in the application list during the sleep mode.

If the electronic device enters a predetermined place (or if a predetermined time elapses after the electronic device enters the predetermined place), the application control module may limit operations of at least some of applications included in the application list (e.g., applications having 'frozen' or 'semi-frozen' properties). If there is an application set to limit an operation in a corresponding place among applications included in the application list, the application control module may limit at least some operations associated with the corresponding application during, for example, the sleep mode. The application control module may determine a position of an electronic device using GPS information received by a GPS module, a base station, a Wi-Fi positioning system (WPS), a beacon signal, etc.

If the electronic device connects with a predetermined external device (or if a predetermined time elapses after the electronic device connects with the predetermined external device), the application control module may limit operations of at least some of applications included in the application list. For example, the application control module may limit an operation while the control module is in the sleep mode. For example, if the electronic device connects with an access point located in a specific space (e.g., a home or an office), the application control module may limit at least some operations associated with a predetermined application.

If the electronic device disconnects with the predetermined external device, the application control module may permit an operation of an application included in the application list.

The application control module may also limit operations of at least some of applications included in the application list. For example, the application control module may limit an operation while the control module is in the sleep mode. For example, the application control module may limit at least some operations associated with a predetermined application at a time zone (e.g., from 11 p.m. to 8 a.m.) set by a user.

The application control module may limit operations of at least some of applications included in the application list according to the remaining capacity of a battery. For example, the application control module may receive information about the remaining capacity of the battery from a power management module. If the remaining capacity of the battery is a predetermined amount or less, the application control module may limit operations of at least some of applications included in the application list. For example, if the remaining capacity of the battery is 20% or less (or 50% or less), the application control module may limit at least some operations associated with a predetermined application.

The application control module may verify expected battery duration. Therefore, the application control module may limit at least some operations associated with a predetermined application. The expected battery duration may be a value estimated using an amount of current consumed by the electronic device during a predetermined time range or a current amount of current of the battery.

While the electronic device connects to a power supply device (e.g., a wired or wireless charger), the application control module may refrain from limiting operations of at least some of applications included in the application list.

The application control module may limit an operation of at least some of applications included in the application list according to network usage. For example, if cellular data usage is a predetermined standard or greater, the application control module may limit operations of at least some of applications included in the application list. For example, the application control module may limit an operation associated with communication among operations associated with an application having 'frozen' properties if cellular data usage has exceed a predetermined level.

If a user request for limiting an operation of a specific application is input, the application control module may limit operations of at least some of applications included in the application list. For example, the application control module may limit another function of another application or the electronic device associated with an operation of the corresponding application.

The application control module may end an application of a 'frozen' state among executing applications. If the display is turned off or if the electronic device operates in a low-power mode, the application control module may end the application of the 'frozen' state. After a predetermined time (e.g., ten minutes) elapses, after the display is turned off or the electronic device starts operating in the low-power mode, the application control module may end the application of the 'frozen' state. The application control module may delete data associated with executing the application of the 'frozen' state, e.g., from a first memory 121 of FIG. 1, and may end the corresponding application.

Figure 3A:
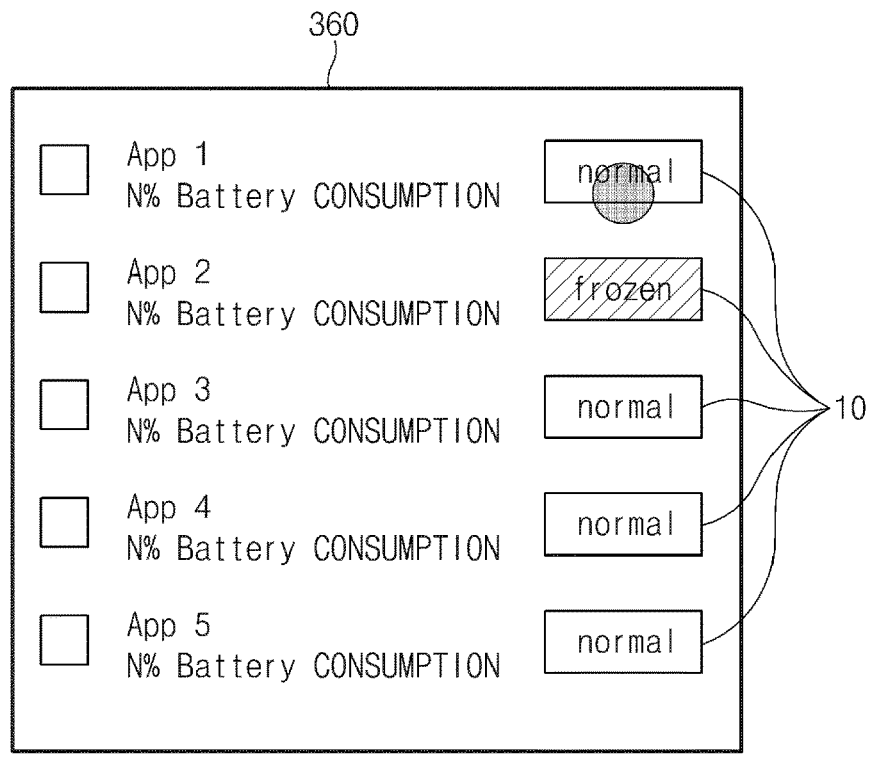
FIGS. 3A and 3B illustrate a user interface according to an embodiment of the present disclosure.
Figure 3B:
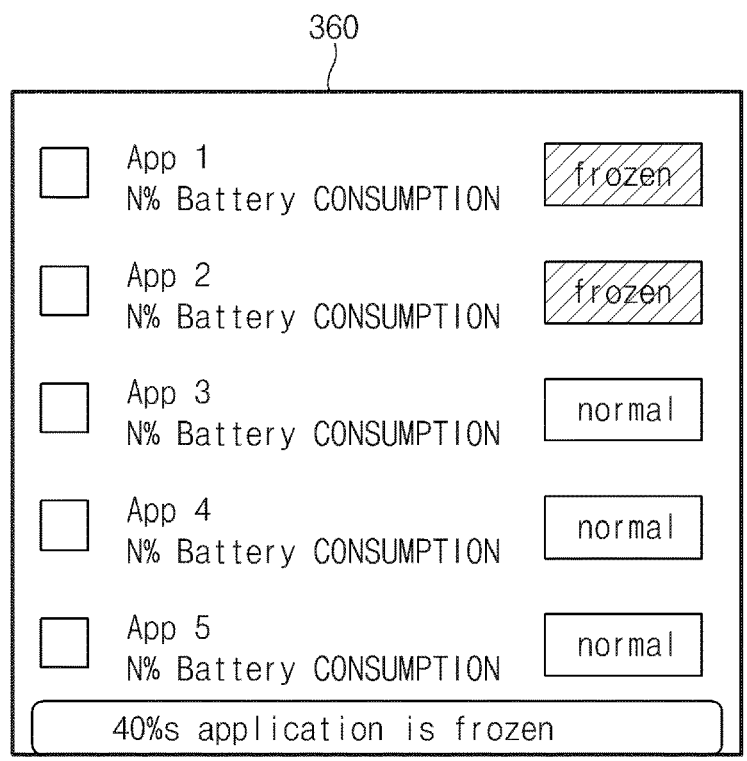

FIGS. 3A and 3B illustrate a user interface according to an embodiment of the present disclosure.

Referring to FIGS. 3A and 3B, a display 360 displays a user interface for limiting an operation of an application included in an application list or releasing an operation limit of an application.

The user interface may arrange and display applications included in the application list according to a predetermined condition (e.g., a name of each of the applications, a recently used time of each of the applications, a numeric value in which a user verifies notification, a state of each of the applications, or an amount of battery consumed by each of the applications). The user interface may include objects 10 for selecting each application.

In FIG. 3A, the user interface displays an application (App 2) that is limited in its operation (e.g., an application which is in a 'frozen' state) in a way different from that of the other applications (App 1, App 3, App, 4, and App 5). For example, an object of the application which is limited in the operation may display text different from that of an object of an application that is not limited in its operation and may be displayed with a shape, a color, contrast, etc., which is different from those of the applications that are not limited in the operation.

A user may limit an operation of a specific application included in the application list and may release the operation limit, using the object 10 included in the user interface. For example, in FIG. 3A, when the user selects the object 10 of App 1, a state of App 1 is changed to a 'frozen' state, as illustrated in FIG. 3B, and an operation of the first application App 1 may be limited. Also, text of the object 10 of the first application App 1 may be changed from a 'normal' state to the 'frozen' state, and a color and contrast of the object may be changed.

Figure 4A:
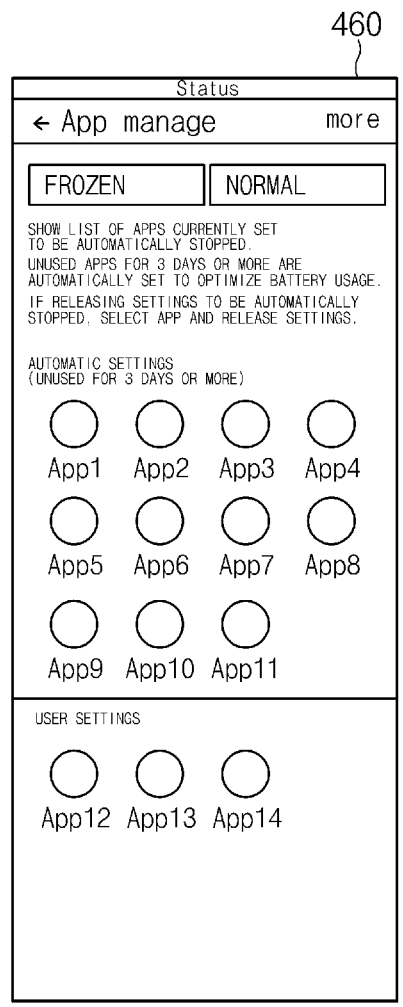
FIGS. 4A and 4B illustrate a user interface according to an embodiment of the present disclosure.
Figure 4B:
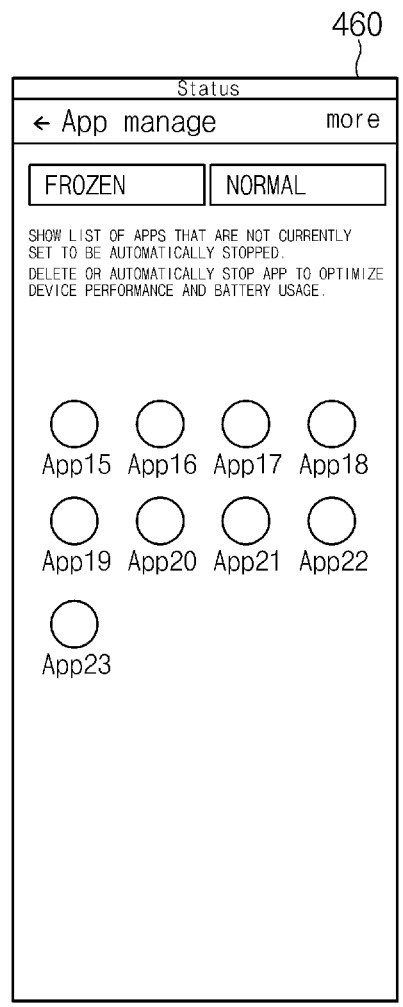

FIGS. 4A and 4B illustrate a user interface according to an embodiment of the present disclosure.

Referring to FIGS. 4A and 4B, a control module displays a user interface including applications included in an application list on a display 460. The user interface provides a list of applications that are limited in their operations and a list of applications that are permitted to operate, through different menus.

Referring to FIG. 4A, the display 460 displays a list of applications that are limited in their operation. For example, if a user selects a 'frozen' tab, the display 460 displays the list of the applications that are limited in the operations.

The display 460 displays a list of applications that are limited in their operations according to a predetermined condition (App 1 to App 11) and a list of applications that are limited in their operations according to a user request (or user settings) (App 12 to App 14), on divided regions.

Applications that are limited in their operations may be moved to a list of applications that are permitted to operate or a list of applications that are not set to limit/permit their operations, according to an event for releasing an operation limit or a user request. For example, if the user executes an application registered in a list of applications that are limited in their operations according to a predetermined condition, the application may be moved from the list of the applications that are limited in the operations to a list of applications that permitted to operate or a list of applications that are not set to limit/permit their operations.

Applications that are limited in their operations according to a user request may be moved to a list of applications that are permitted to operate, according to a user request.

The user may select at least some of applications that are limited in their operations according to a predetermined condition and may set the selected applications to limit their operations according to a user request. For example, if an application that is limited in its operation according to a predetermined condition is set to limit the operation by the user, the application may be moved to a list of applications that are limited in their operations according to a user request.

Referring to FIG. 4B, the display 460 displays a list of applications that are permitted to operate (App 15 to App 23). For example, if the user selects a 'normal' tab, the display 460 displays a list of applications that are not limited in their operations.

The user may select at least some of applications that are permitted to operate and may set the selected applications to limit their operations. For example, an application set to limit its operation by the user may be moved to a list of applications that are limited in their operations according to user settings, on the user interface illustrated in FIG. 4A.

Figure 5A:
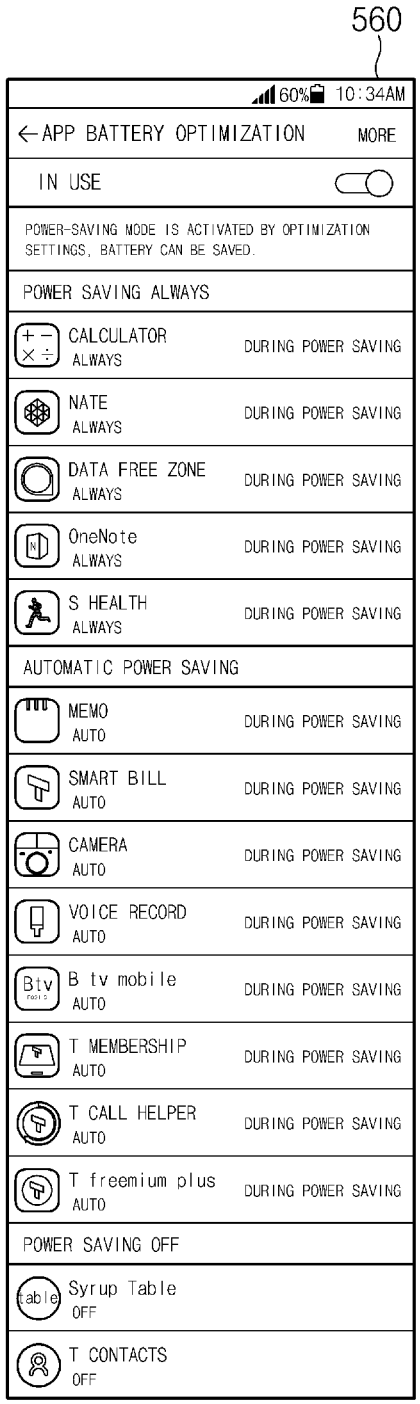
FIGS. 5A and 5B illustrate user interfaces according to an embodiment of the present disclosure.
Figure 5B:
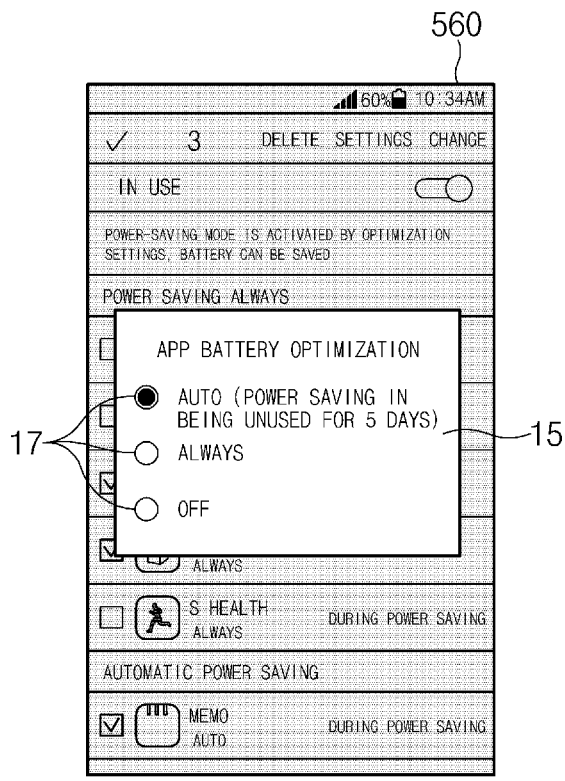

FIGS. 5A and 5B illustrate user interfaces according to an embodiment of the present disclosure.

Referring to FIG. 5A, a control module displays a user interface including applications included in an application list on a display 560. The user interface displays a list of applications that are limited in their operations and a list of applications that are permitted to operate, on different regions.

The display 560 displays a list of applications (e.g., 'power saving always') that are limited in their operations according to a user request, a list of applications (e.g., 'automatic power saving') that are limited in their operations according to a predetermined condition, and a list of applications (e.g., 'power saving off') that are permitted to operate.

If the user selects one of applications included in an application list illustrated in FIG. 5A, the display 460 displays a user interface for changing the application list including the selected application as illustrated in FIG. 5B. For example, the user interface is provided in the form of a pop-up window 15 and includes objects 17 for selecting battery optimization options that place the application in one of a list of applications in their operations limited by the user (e.g., 'always'), a list of applications that are limited in their operations by a predetermined condition (e.g., 'automatic'), and a list of applications that are permitted to operate (e.g., 'off'). For example, the user may select one of the objects 17 and may change an application list including applications.

Figures 6A, 6B:
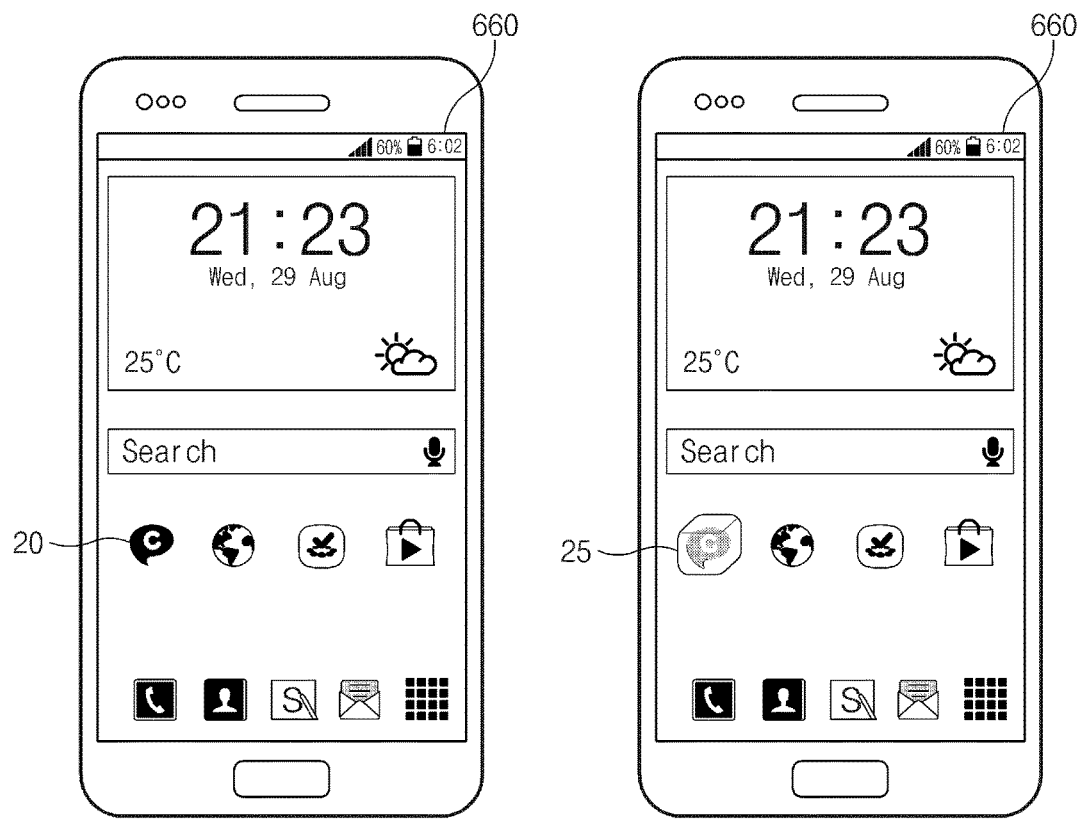
FIGS. 6A and 6B illustrate a user interface according to an embodiment of the present disclosure.

FIGS. 6A and 6B illustrate a user interface according to various embodiments of the present disclosure.

Referring to FIGS. 6A and 6B, a user interface displayed on a display 660 includes application icons.

If an operation of an application is limited, an application control module may control the display 660 to change and display an application icon displayed on the display 660.

For example, if the operation of the application is limited, the application control module may control the display 660 to change a basic icon of the application, e.g., to display a color or contrast of a basic icon of the application, to synthesize and display the basic icon with another image, or to replace and display the basic icon with another image. Alternatively, if the operation of the application is limited, the application control module may change a display position of an icon of the application.

Referring to FIG. 6A, among the plurality of applications, a basic icon 20 is provided, where the operation of the application is not limited.

Referring to FIG. 6B, the display 660 changes the basic icon 20 of the application to an icon surrounded by ice 25 in order to indicate that an operation of the application is limited. For example, at least one of a shape, a color, transparency, a size, and/or a position of an icon may be changed.

FIGS. 7A and 7B illustrate user interfaces according to an embodiment of the present disclosure.

Referring to FIGS. 7A and 7B, an application control module may inform a user of information indicating that an operation of an application is limited or permitted before/ after the operation of the application is limited or the operation limit is released. For example, the application control module may apply an ON/OFF effect (or a blinking effect) to an application icon, displayed on a display 760, during a specific time. Alternatively, the application control module may control the display 760 to display an object (e.g., a text object) for providing notification that an operation limit state of an application is changed.

Referring to FIG. 7A, the display 760 displays an object 27 for indicating that an operation limit state of an application is changed.

Referring to FIG. 7B, if the user selects the object 27, the display 760 displays a user interface for controlling a list of applications (e.g., 'recent power saving') that are changed in their operation limit state and operation states of the applications included in the list.

If a sleep mode is changed to a wake-up mode by the user or an application having 'normal' properties, the application control module may provide a notification (e.g., a visual, aural, or tactile output) associated with an operation requested by an application having 'frozen' properties.

Figure 8:
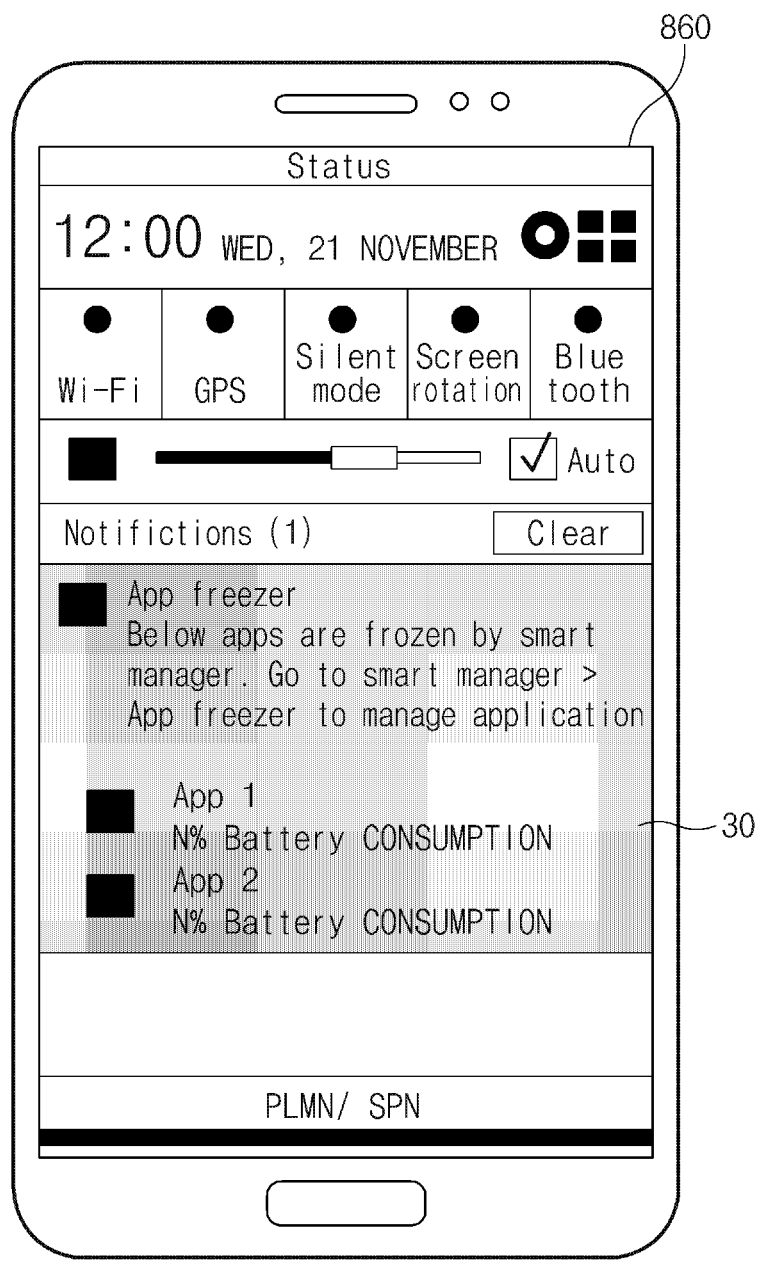
FIG. 8 illustrates a user interface according to an embodiment of the present disclosure.

FIG. 8 illustrates a user interface according to an embodiment of the present disclosure.

Referring to FIG. 8, a display 860 displays information 30, about an application that is limited in its operation, through a user interface providing notification information. For example, the display 860 displays a name of the application that is limited in the operation and information about battery power consumed by the application.

The user interface (e.g., a status bar or a quick menu), which provides the notification information, may be shown on the display 860 or may be hidden through a touch gesture or a voice instruction.

If an event associated with an application which is limited in its operation occurs, an application control module 173 may permit the application to operate. According to an embodiment of the present disclosure, the event associated with the application which is limited in the operation may include an event generated by an external electronic device (e.g., an application server or an external electronic device). For example, the event associated with the application which is limited in the operation may be an event for receiving information, such as an instant message, an email, an advertisement, news, and weather, from the external device.

If an event associated with an application which is limited in its operation in a state where an operation of the application is limited occurs, notification that the event occurs may not be provided to a user. According to an embodiment of the present disclosure, if the event associated with the application which is limited in the operation occurs, the application control module 173 may temporarily permit an operation of the application in which the event occurs and may perform an operation associated with the event. For example, the application control module 173 may execute the application in which the event occurs and may provide information, about a message, an email, an advertisement, news, and the like received from the external device, in the form of notification. If the operation associated with the event is completed, the application control module 173 may limit the operation of the application, in which the event occurs, again.

Figure 9:
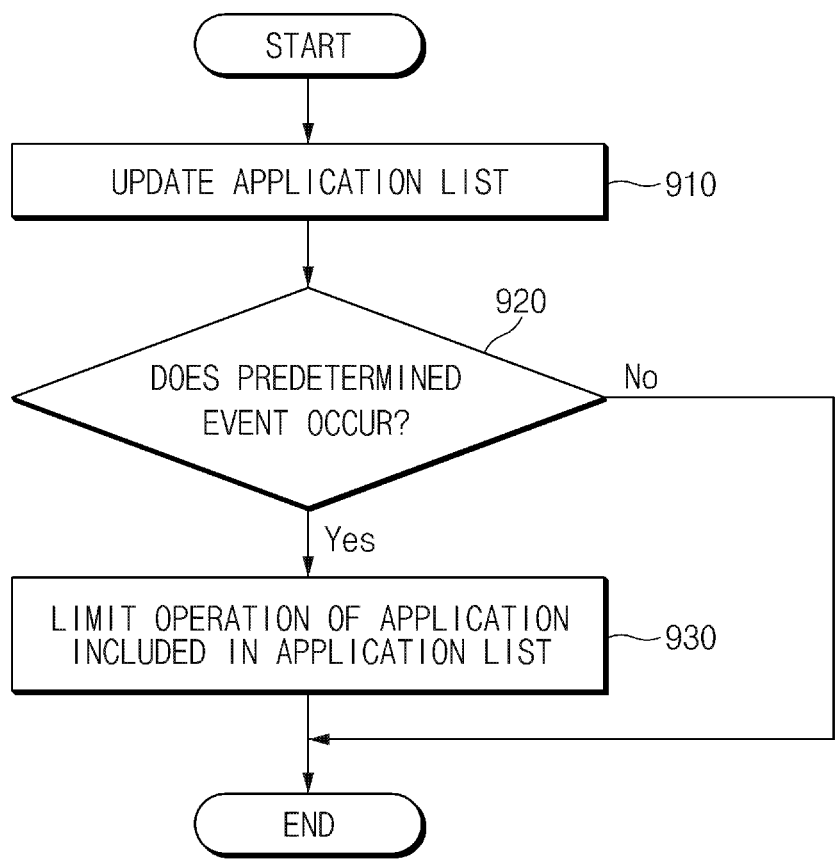
FIG. 9 is a flowchart illustrating an application control method of an electronic device according to an embodiment of the present disclosure.

FIG. 9 is a flowchart illustrating an application control method of an electronic device according to an embodiment of the present disclosure. For example, the method illustrated in FIG. 9 may be performed by the electronic device 100 illustrated in FIG. 1.

Alternatively, at least some of operations according to various embodiments of the present disclosure may be performed in an external electronic device (e.g., a server).

Further, data associated with at least some of the operations according to various embodiments of the present disclosure may be stored in the server.

Referring to FIG. 9, the electronic device updates an application list in step 910.

For example, the electronic device may generate an application list according to at least one of an operation of an application, use history of the application, and user settings, and may store the generated application list in a memory. Thereafter, the electronic device may update an application list stored in the memory according to at least one of an operation of an application, use records of the application, or a user request. For example, the electronic device may register and add a new application in an application list or may delete some of applications included in the application list. The electronic device may add an application, which performs a registration process to a push server, to an application list.

The electronic device may verify application use records of a user and may add an application, which is not used at a predetermined level or more during a predetermined time, to the application list.

The electronic device may determine a probability that the user will verify notification associated with an application and may add an application having a probability of a predetermined value or less, to the application list.

The electronic device may delete an application, which is executed (or used) a predetermined number of time or more (e.g., seven times or more) during a predetermined time (e.g. one week), among applications included in the application list.

The electronic device may delete an application having a probability of a predetermined value or more (e.g., 50% or more), from among the applications included in the application list.

The electronic device may add a specific application to the application list or may delete the specific application from the application list, according to a user request.

In step 920, the electronic device determines whether a predetermined event occurs.

For example, the electronic device may determine whether a control module enters a sleep mode, whether a display is turned off, whether the electronic device enters a predetermined place, or whether the electronic device connects with a predetermined external electronic device.

For example, the electronic device may determine whether a current time corresponds to a time set by a user, may determine whether the remaining capacity of a battery is a predetermined value or less, or may determine whether a user request for limiting an operation of an application is input.

If the predetermined event occurs in step 920, the electronic device limits an operation of an application included in the application list in step 930.

For example, if a predetermined time elapses after the predetermined event occurs, the electronic device may limit an operation of an application included in the application list.

The electronic device may limit operations of the other applications, except for an application that performs an operation within a predetermined time after the electronic device enters a sleep mode, among applications included in the application list.

The electronic device may display an icon (or list) of an application, which is executable by the electronic device, on the display.

If an operation of an application is limited, the electronic device may change and display an application icon displayed on the display.

Before/after an operation of an application is limited or the operation limit is released, the electronic device may inform the user that a function of limiting the operation of the application is changed. For example, the electronic device may control an application icon displayed on the display to apply an ON/OFF (or blinking) effect for a specific time.

Figure 10:
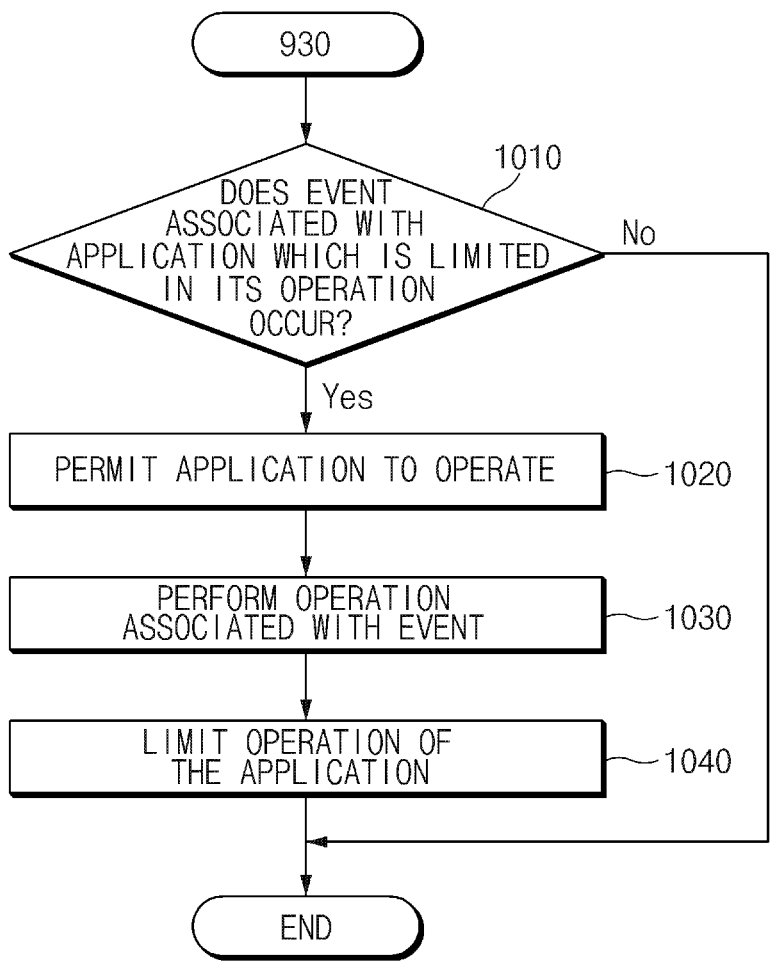
FIG. 10 is a flowchart illustrating an application control method of an electronic device according to an embodiment of the present disclosure.

FIG. 10 is a flowchart illustrating an application control method of an electronic device according to an embodiment of the present disclosure. Specifically, FIG. 10 illustrates operations of a method performed after an operation of an application is limited, e.g., as described above with reference to FIG. 9.

Referring to FIG. 10, after an operation of an application is limited, the electronic device determines whether an event associated with the application that is limited in the operation occurs in step 1010. For example, the event associated with the application that is limited in the operation may refer to an event generated by an external device (e.g., an application server or an external electronic device), not an event by an application installed in the electronic device. For example, the event associated with the application that is limited in the operation may also be an event in which the electronic device receives information, such as an instant message, an email, an advertisement, news, and weather, from an external device (e.g., a push server 300 of FIG. 1).

In step 1020, the electronic device permits an operation of the application in which the event occurs. For example, the electronic device may execute the application in which the event occurs.

In step 1030, the electronic device performs an operation associated with the event. For example, the electronic device may provide information about a message, an email, an advertisement, news, etc., received from the external device, in the form of notification.

If the operation associated with the event is completed, in step 1040, the electronic device limits an operation of the application, in which the event occurs, again.

Additionally, the application control method of the electronic device may include updating a first application list including at least one application installed in the electronic device according to at least one of an operation of an application, use history of the application, or a user request, and limiting an operation of at least one of the at least one application included in the first application list, if a predetermined event occurs.

The updating of the first application list may include registering at least one of an application which provides a push service, an application set to perform a predetermined operation at least once during a predetermined time period, an application which is not used during a predetermined time, an application in which a user response to notification associated with an application is a predetermined probability or less, or an application in which there is no user response to the notification associated with the application during a predetermined time, in the first application list.

The operation of the application may include a first operation performed while information corresponding to the operation of the application is displayed on a display, a second operation performed while the information corresponding to the operation of the application is not displayed on the display, and a third operation for providing information associated with the application to another application according to a request of the other application.

The updating of the first application list may include determining whether to use the application according to at least one of the first operation, the second operation, or the third operation.

The determining whether to use the application may include providing different weight values to the first operation, the second operation, and the third operation and determining whether to use the application.

The limiting of the operation of the at least one application may include setting each of applications included in the first application to one of a first state of permitting the application to operate according to the use history of the application, a second state of reducing the number of times the application operates, and a third state of limiting at least some of operations of the application and limiting the operation of the at least one application according to a state of the application.

The limiting of the operation of the at least one application may include changing a state set in the application according to a user input and limiting the operation of the at least one application according to the changed state of the application.

The limiting of the operation of the at least one application may include limiting the operation of the at least one application according to at least one of whether a display is inactivated, a current time, a current position of the electronic device, the remaining capacity of a battery of the electronic device (or a rate of battery consumption), or cellular data usage.

The application control method may further include receiving a second application list including at least one application installed in an external electronic device from the external electronic device, determining whether there is an application which performs the same function by comparing the first application list with the second application list, and limiting an operation of the application which performs the same function in one of the electronic device and the external electronic device.

Figure 11:
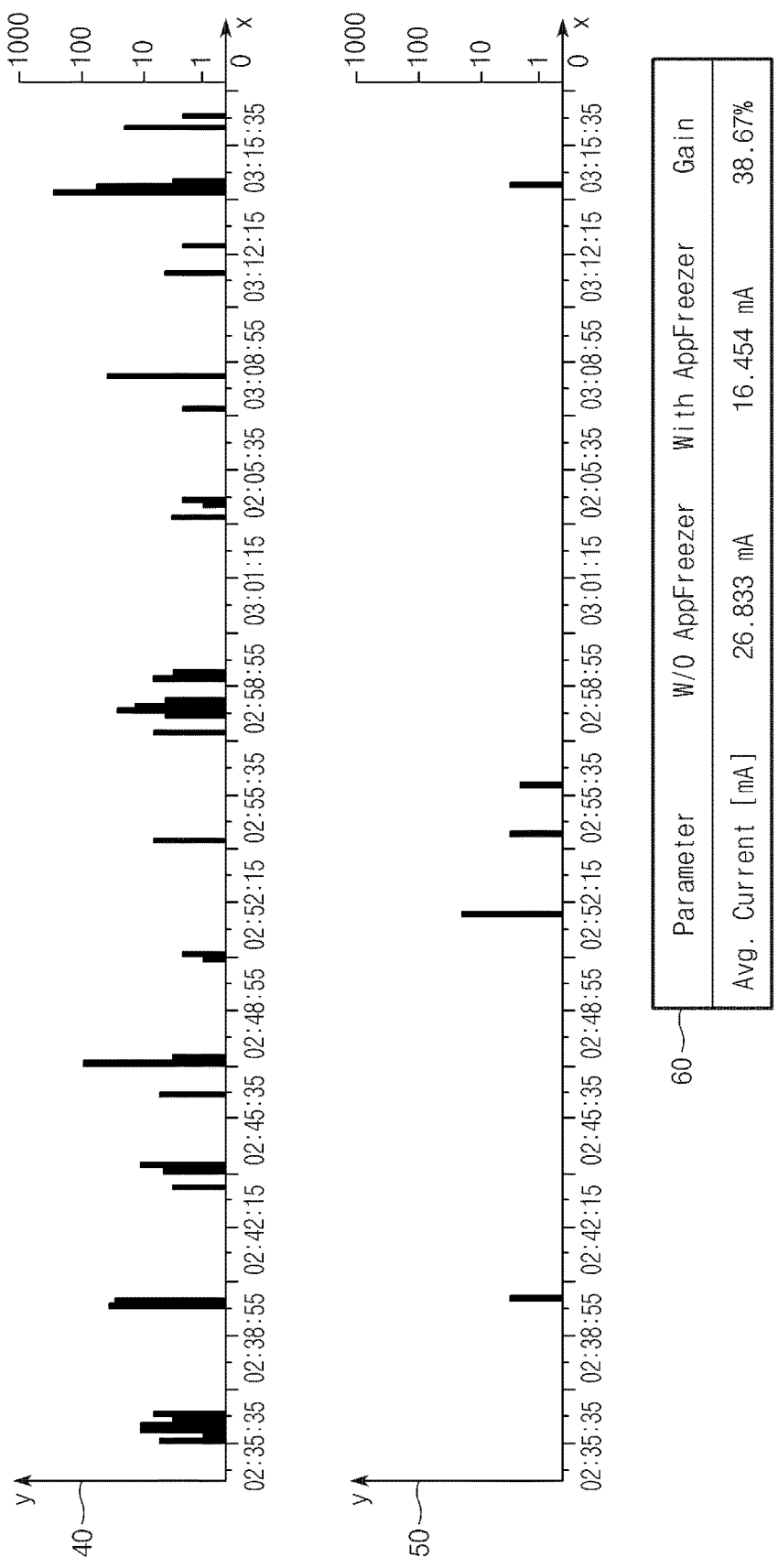
FIG. 11 illustrates an operation limit effect of an application according to an embodiment of the present disclosure.

FIG. 11 illustrates an operation limit effect of an application according to an embodiment of the present disclosure.

Referring to FIG. 11, first and second graphs 40 and 50 illustrate results of measuring an amount of data packets communicated from an electronic device, e.g., the electronic device 100 of FIG. 1. The first graph 40 indicates an amount of communicated data packets according to a time when an operation of an application is not limited, and the second graph 50 indicates an amount of communicated data packets according to a time when the operation of the application is limited. An x-axis of each of the first and second graphs 40 and 50 denotes time and a y-axis denotes an amount of packets (bytes). The y-axis may also correspond to an amount of current consumed.

Referring to the first and second graphs 40 and 50, if an operation is performed by a request of an application when a control module is in a sleep mode, a packet may be communicated. Comparing the first and second graphs 40 and 50, the number of times that packets are communicated in the second graph 50, if the operation of the application is limited, reduces more than that of the first graph 40, if the operation of the application is not limited.

In FIG. 11, Table 60 illustrates a result of measuring current consumption for six hours when a display is turned off (or where a control mode is in a sleep mode) using a Galaxy Note 3 (SM-N9005) device by Samsung Electronics Co., Ltd. Comparing average currents, an average current if an operation of an application is not limited (without an AppFreezer) is 26.833 mA and an average current if the operation of the application is limited (with the AppFreezer) is 16.454 mA. Therefore, a current of 10.379 mA per hour may be saved, and an effect of reducing current consumption at about 38.67% may be obtained.

According to an embodiment of the present disclosure, an electronic device may reduce current consumed by an application by limiting an unnecessary or selective operation of the application when a display is turned off or when a control module enters a sleep mode. Therefore, an available time of the electronic device may be increased. The operation limit may be maintained irrespective of whether the display is turned off or whether the control module enters the sleep mode, before a predetermined release event occurs or before a user release request is input.

Figure 12:
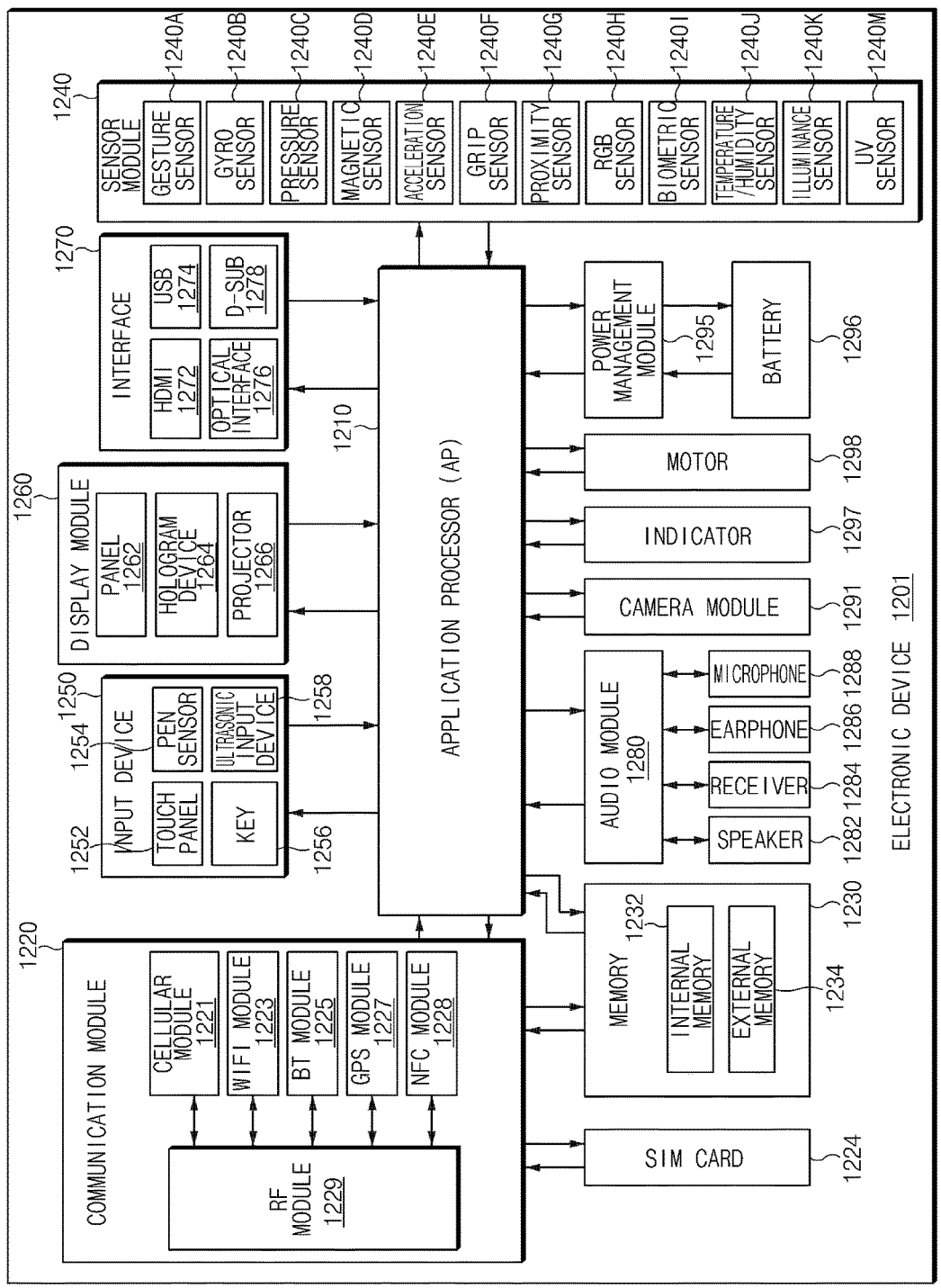
FIG. 12 illustrates an electronic device according to an embodiment of the present disclosure.

FIG. 12 illustrates an electronic device according to an embodiment of the present disclosure.

Referring to FIG. 12, the electronic device 1201 includes an application processor (AP) 1210, a communication module 1220, a subscriber identification module (SIM) 1224, a memory 1230, a sensor module 1240, an input device 1250, a display module 1260, an interface 1270, an audio module 1280, a camera module 1291, a power management module 1295, a battery 1296, an indicator 1297, and a motor 1298.

The application processor 1210 may drive, for example, an OS or an application program to control a plurality of hardware or software components connected thereto and may process and compute a variety of data. The application processor 1210 may be implemented with, for example, an SoC. The application processor 1210 may further include a GPU and/or an image signal processor. The application processor 1210 may include at least some of the components shown in FIG. 12 (e.g., a cellular module 1221). The application processor 1210 may load instructions or data received from at least one of other components (e.g., a non-volatile memory) to a volatile memory to process the data and may store various data in a non-volatile memory.

The communication module 1220 may have the same or similar configuration as or to that of a communication module 110 of FIG. 1.

The communication module 1220 includes the cellular module 1221, a Wi-Fi module 1223, a Bluetooth (BT) module 1225, a GNSS module 1227 (e.g., a GPS module, a Glonass module, a Beidou module, or a Galileo module), an NFC module 1228, and an RF module 1229.

The cellular module 1221 may provide a voice call service, a video call service, a text message service, an Internet service, etc., through a communication network. The cellular module 1221 may identify and authenticate the electronic device 1201 in a communication network using the SIM 1224. The cellular module 1221 may perform at least a part of the functions that may be provided by the application processor 1210. The cellular module 1221 may include a communication processor (CP).

The Wi-Fi module 1223, the BT module 1225, the GNSS module 1227, and/or the NFC module 1228 may include a processor for processing data transmitted and received through the corresponding module. At least some (e.g., two or more) of the cellular module 1221, the Wi-Fi module 1223, the BT module 1225, the GNSS module 1227, and the NFC module 1228 may be included in one integrated chip (IC) or one IC package.

The RF module 1229 may transmit and receive a communication signal (e.g., an RF signal). The RF module 1229 may include a transceiver, a power amplifier module (PAM), a frequency filter, a low noise amplifier (LNA), an antenna, etc. At least one of the cellular module 1221, the Wi-Fi module 1223, the BT module 1225, the GNSS module 1227, and the NFC module 1228 may transmit and receive an RF signal through a separate RF module.

The SIM 1224 may include a card that includes a SIM and/or an embedded SIM. The SIM 1224 may include unique identification information (e.g., an integrated circuit card identifier (ICCID)) or subscriber information (e.g., an international mobile subscriber identity (IMSI)).

The memory 1230 includes an embedded memory 1232 and an external memory 1234. The embedded memory 1232 may include at least one of a volatile memory (e.g., a dynamic random access memory (DRAM), a static RAM (SRAM), a synchronous dynamic RAM (SDRAM), etc.), a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, etc.), a hard drive, and a solid state drive (SSD)).

The external memory 1234 may further include a flash drive, a compact flash (CF), a secure digital (SD), a micro-SD, a mini-SD, an extreme digital (xD), a memory stick, etc. The external memory 1234 may functionally and/or physically connect with the electronic device 1201 through various interfaces.

The sensor module 1240 may measure a physical quantity or may detect an operation state of the electronic device 1201, and convert the measured or detected information to an electric signal. The sensor module 1240 includes a gesture sensor 1240A, a gyro sensor 1240B, a pressure sensor 1240C, a magnetic sensor 1240D, an acceleration sensor 1240E, a grip sensor 1240F, a proximity sensor 1240G, a color sensor 1240H (e.g., a red, green, blue (RGB) sensor), a biometric sensor 1240I, a temperature/humidity sensor 1240J, an illuminance sensor 1240K, and an ultraviolet (UV) sensor 1240M.

Additionally or alternatively, the sensor module 1240 may further include an e-nose sensor, an electromyography (EMG) sensor, an electroencephalogram (EEG) sensor, an electrocardiogram (ECG) sensor, an infrared (IR) sensor, an iris sensor, a fingerprint sensor, etc. The sensor module 1240 may further include a control circuit for controlling at least one or more sensors included therein.

The electronic device 1201 may further include a processor configured to control the sensor module 1240, as part of the application processor 1210 or to be independent of the application processor 1210. For example, while the application processor 1210 is in a sleep state, the electronic device 1201 may control the sensor module 1240.

The input device 1250 includes a touch panel 1252, a (digital) pen sensor 1254, a key 1256, and an ultrasonic input unit 1258. The touch panel 1252 may recognize a touch input using at least one of a capacitive detecting method, a resistive detecting method, an infrared detecting method, and an ultrasonic detecting method. The touch panel 1252 may further include a control circuit. The touch panel 1252 may further include a tactile layer and may provide a tactile reaction to a user.

The (digital) pen sensor 1254 may be a part of a touch panel or may include a separate sheet for recognition.

The key 1256 may include a physical button, an optical key, or a keypad.

The ultrasonic input unit 1258 may detect an ultrasonic signal generated by an input tool, e.g., through a microphone 1288, and may verify data corresponding to the detected ultrasonic signal.

The display 1260 includes a panel 1262, a hologram device 1264, and a projector 1266. The panel 1262 may include the same or similar configuration as or to that of the display 160 illustrated in FIG. 1. The panel 1262 may be flexible, transparent, or wearable.

The panel 1262 and the touch panel 1252 may be integrated into one module.

The hologram device 1264 may show a stereoscopic image in a space using interference of light.

The projector 1266 may project light onto a screen to display an image. The screen may be positioned inside or outside the electronic device 1201.

The display 1260 may further include a control circuit for controlling the panel 1262, the hologram device 1264, and/or the projector 1266.

The interface 1270 includes a high-definition multimedia interface (HDMI) 1272, a universal serial bus (USB) 1274, an optical interface 1276, and a D-subminiature 1278. Additionally or alternatively, the interface 1270 may include a mobile high definition link (MHL) interface, an SD card/multimedia card (MMC) interface, and/or an infrared data association (IrDA) standard interface.

The audio module 1280 may convert a sound and an electric signal in dual directions. The audio module 1280 may process sound information input or output through, for example, a speaker 1282, a receiver 1284, an earphone 1286, the microphone 1288, etc.

The camera module 1291 captures a still image and a moving image. The camera module 1291 may include one or more image sensors (e.g., a front sensor or a rear sensor), a lens, an image signal processor (ISP), and/or a flash (e.g., a light emitting diode (LED) or a xenon lamp).

The power management module 1295 may manage power of the electronic device 1201. For example, the power management module 1295 may include a power management integrated circuit (PMIC), a charger IC, and/or a battery gauge. The PMIC may have a wired charging method and/or a wireless charging method. The wireless charging method may include a magnetic resonance method, a magnetic induction method, an electromagnetic method, etc.

An additional circuit for wireless charging, e.g., a coil loop, a resonance circuit, a rectifier, etc., may be further provided.

The battery gauge may measure the remaining capacity of the battery 1296 and voltage, current, or temperature thereof, while the battery 1296 is charged.

The battery 1296 may include a rechargeable battery or a solar battery.

The indicator 1297 may display a specific state (e.g., a booting state, a message state, a charging state, etc.) of the electronic device 1201 or a part thereof (e.g., the application processor 1210).

The motor 1298 may convert an electric signal into mechanical vibration and may generate vibration, a haptic effect, etc.

The electronic device 1201 may include a processing unit (e.g., a GPU) for supporting a mobile TV. The processing unit for supporting the mobile TV may process media data according to different standards, such as a digital multimedia broadcasting (DMB) standard, a digital video broadcasting (DVB) standard, a media flow standard, and etc.

Each of the above-described elements of the electronic device 1201 may be configured with one or more components, and the names of the corresponding elements may be changed according to the type of the electronic device. Alternatively, the electronic device 1201 may include at least one of the above-described elements, some elements may be omitted from the electronic device 1201, or other additional elements may be further included in the electronic device 1201. Additionally, some of the elements of the electronic device 1201 may be combined with each other to form one entity, thereby making it possible to perform the functions of the corresponding elements in the same manner as before the combination.

Figure 13:
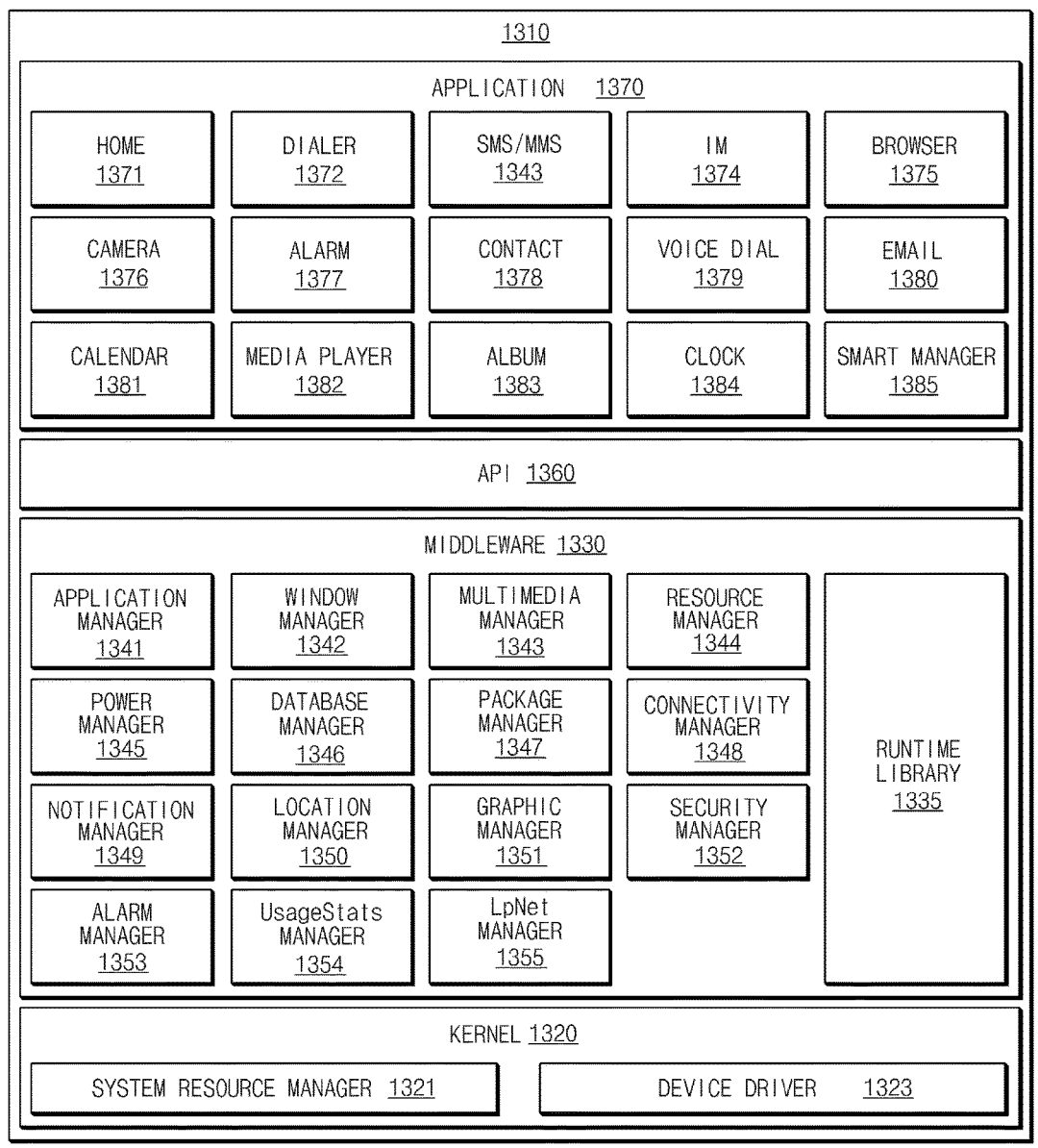
FIG. 13 illustrates a program module according to an embodiment of the present disclosure.

FIG. 13 illustrates a program module according to an embodiment of the present disclosure.

Referring to FIG. 13, a program module 1310 may include an OS for controlling resources associated with an electronic device (e.g., the electronic device 100 of FIG. 1) and/or various applications which are executed on the OS. Examples of the OS include Android®, iOS®, Windows®, Symbian®, Tizen®, Bala®, etc.

The program module 1310 includes a kernel 1320, middleware 1330, an API 1360, and applications 1370. At least part of the program module 1310 may be preloaded in the electronic device, or may be downloaded from an external electronic device.

The kernel 1320 includes a system resource manager 1321 and a device driver 1323.

The system resource manager 1321 may control, assign, collect, etc., system resources. The system resource manager 1321 may include a process management unit, a memory management unit, a file system management unit, etc.

The device driver 1323 may include a display driver, a camera driver, a BT driver, a shared memory driver, a USB driver, a keypad driver, a Wi-Fi driver, an audio driver, an inter-process communication (IPC) driver.

The middleware 1330 may provide functions used by the applications 1370 in common, and may provide various functions to the applications 1370 through the API 1360, such that the applications 1370 efficiently use limited system resources in the electronic device. The middleware 1330 includes a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, an alarm manager 1353, a UsageStats manager 1354, and an LpNet manager 1355.

The runtime library 1335 may include a library module used by a compiler to add a new function through a programming language while the applications 1370 are executed. The runtime library 1335 may perform a function about input and output management, memory management, and/or an arithmetic function.

The application manager 1341 may manage a life cycle of at least one of the applications 1370.

The window manager 1342 may manage graphic user interface (GUI) resources used on a screen of the electronic device.

The multimedia manager 1343 may ascertain formats for reproducing various media files and may encode or decode media files using codecs corresponding to the corresponding formats.

The resource manager 1344 may manage source codes of at least one of the applications 1370, and may manage resources of a memory, a storage space, etc.

The power manager 1345 may act together with a basic input/output system (BIOS), may manage a battery or a power source, and may provide power information for an operation of the electronic device.

The database manager 1346 may generate, search, or change a database to be used in at least one of the applications 1370.

The package manager 1347 may manage installation or update of an application distributed in the form of a package file.

The connectivity manager 1348 may manage wireless connection such as a Wi-Fi connection, a BT connection, etc.

The notification manager 1349 may display or notify events, such as an arrival message, an appointment, and proximity notification, by a method which is not disturbed to the user.

The location manager 1350 may manage location information of the electronic device.

The graphic manager 1351 may manage a graphic effect to be provided to the user or a user interface (UI) related to the graphic effect.

The security manager 1352 may provide security functions for system security, user authentication, etc.

The alarm manager 1353 may provide an alarm function at a predetermined time.

The applications 1370 may perform a desired function at a predetermined time or periodically using the alarm manager 1353.

The UsageStats manager 1354 may manage information about when and how many times a user uses an application. For example, the UsageStats manager 1354 may manage information, such as a user account, an execution time, an end time, an operation time, an available memory, available hardware, current consumption, and a degree of use by the user (e.g., a probability that the user will verify notification), for each of the available applications 1370.

The LpNet manager 1355 may collect and analyze information about other managers including the application manager 1341, the package manager 1347, the location manager 1350, the alarm manager 1353, and the UsageStats manager 1354 and may control an application. The result of the controlling the application may be provided to the user. The UsageStats manager 1354 may receive a user request through a smart manager 1385 and may transmit the received user request to the LpNet manager 1355. The LpNet manager 1355 may perform an operation corresponding to the user request. For example, the LpNet manager 1355 may obtain app execution information from the application manager 1341, may obtain installed app information from the package manager 1347, and may obtain location information records from the location manager 1350. The LpNet manager 1355 may obtain information about the number of wakeup times from the alarm manager 1353 and may obtain information, about when and how many times the user uses an application, from the UsageStats manager 1354. For example, the LpNet manager 1355 may determine an unused application according to information collected from another manager (or other managers) and may limit an operation of the application.

Alternatively, an application executed by the user among applications which are limited in their operations may release an operation limit. For example, the LpNet manager 1355 may inform the user of an application, which is limited in its operation, through the notification manager 1349, as illustrated in FIG. 4B. For example, the LpNet manager 1355 may request the application manager 1341 to prohibit an application from being executed.

Alternatively, the application manager 1341 may prohibit the application, limited by the LpNet manager 1355, from being executed. For example, the LpNet manager 1355 may manage a list of applications which are limited in their operation according to information collected from another manager (or other managers), a list of applications which are limited in their operations by a user request received through the smart manager 1385, and the other application lists. At least one of the application lists may be provided to the user through the smart manager 1385. The user may control an application list provided to the user through an interface of the smart manager 1385. A control signal may be transmitted to the LpNet manager 1355 to be processed.

When the electronic device has a phone function, the middleware 1330 may further include a telephony manager for managing a voice or video communication function of the electronic device.

The middleware 1330 may include a middleware module that configures combinations of various functions of the above-described components. The middleware 1330 may provide a module which specializes according to the type of OS to provide a differentiated function. Also, the middleware 1330 may dynamically delete some old components or may add new components.

The API 1360 may include a set of API programming functions, and may be provided with different components according to the type of OS. For example, for Android® or iOS®, one API set may be provided according to platforms. Further, for Tizen®, two or more API sets may be provided according to platforms.

The applications 1370 include a home application 1371, a dialer application 1372, a short message service/multimedia message service (SMS/MMS) application 1373, an instant message (IM) application 1374, a browser application 1375, a camera application 1376, an alarm application 1377, a contact application 1378, a voice dial application 1379, an e-mail application 1380, a calendar application 1381, a media player application 1382, an album application 1383, a clock application 1384, and the smart manager 1385. Additionally, applications 1370 may include a health care application (e.g., an application for measuring quantity of exercise or blood sugar, etc.), or an environment information application (e.g., an application for providing atmospheric pressure information, humidity information, temperature information, etc).

The applications 1370 may also include an information exchange application for exchanging information between the electronic device (e.g., the electronic device 100 of FIG. 1) and an external electronic device (e.g., the external electronic device 200 of FIG. 1). The information exchange application may include a notification relay application for transmitting specific information to the external electronic device or a device management application for managing the external electronic device.

For example, the notification relay application may include a function of transmitting notification information, which is generated by other applications (e.g., the SMS/MMS application 1343, the e-mail application 1380, the health care application, the environment information application, etc.) of the electronic device, to the external electronic device. Also, the notification relay application may receive notification information from the external electronic device, and may provide the received notification information to the user of the electronic device.

The device management application may manage (e.g., install, delete, or update) at least one (e.g., a function of turning on/off the external electronic device itself (or partial components) or a function of adjusting brightness (or resolution) of a display) of functions of the external electronic device which communicates with the electronic device, an application which operates in the external electronic device, or a service (e.g., a call service or a message service) provided from the external electronic device.

The applications 1370 may include an application that is preset according to attributes of the electronic device (e.g., the health card application of a mobile medical device).

The applications 1370 may include an application received from the external electronic device (e.g., the external electronic device 200 or the push server device 300 of FIG. 1).

The applications 1370 may include a preloaded application or a third party application which may be downloaded from a server.

The names of the components of the program module 1310 may differ according to the type of OS.

The smart manager 1385 may provide an application list and an interface associated with the application list. For example, the application list may be an application list managed by the LpNet manager 1355 or a list generated by obtaining separate application information from the LpNet manager 1355. Further, the application list may be a list of applications which are limited in their operations by the LpNet manager 1355.

For example, the interface associated with the application list may be an interface for adjusting the application list. The user may limit an operation for a specific application or may release the operation limit, through the interface. The interface associated with the application list may determine to monitor an operation of an application registered in the application list, use history of the corresponding application, or a degree of use by the user.

At least a part of the program module 1310 may be implemented with software, firmware, hardware, or at least two or more combinations thereof. At least part of the program module 1310 may be implemented (e.g., executed) by, for example, a processor (e.g., the control module 170 of FIG. 1). At least a part of the program module 1310 may include a module, a program, a routine, sets of instructions, a process, etc., for performing one or more functions.

The term "module" used herein may mean, for example, a unit including one of hardware, software, and firmware or two or more combinations thereof. The term "module" may be interchangeably used with, for example, "unit", "logic", "logical block", "component", "circuit", etc. A "module" may be a minimum unit of an integrated component or a part thereof, or may be a minimum unit performing one or more functions or a part thereof. A "module" may be mechanically or electronically implemented. For example, a "module" may include at least one of an application-specific integrated circuit (ASIC) chip, field-programmable gate arrays (FPGAs), or a programmable-logic device, which is currently known or will be developed in the future, for performing certain operations.

At least a part of a device (e.g., modules or the functions) or a method (e.g., operations) may be implemented with, for example, instructions stored in computer-readable storage media which have a program module. When the instructions are executed by a processor (e.g., the control module 170 of FIG. 1), one or more processors may perform functions corresponding to the instructions. The computer-readable storage media may be a memory, e.g., the memory 120 of FIG. 1.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), etc. Also, the program instructions may include mechanical codes compiled by a compiler and also high-level language codes that may be executed by a computer using an interpreter and the like.

The above-described hardware device may be configured to operate as one or more software modules to perform operations according to various embodiments of the present disclosure, and vice versa.

Modules or program modules according to various embodiments of the present disclosure may include at least one or more of the above-described components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to an embodiment of the present disclosure, an electronic device as described above may increase a battery available time by reducing current consumption by certain applications, while the electronic device operates.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
a memory configured to store a first application list including one or more applications installed in the electronic device; and
a processor configured to update the first application list, by determining a probability that a user will verify a notification associated with an application and adding the application to the first application list if the application has a probability within a predetermined probability range, and
to limit the operation of the application based at least on the first application list,
wherein the processor is further configured to:
set a state of the application included in the first application list,
in response to the application being set to a first state, permit the application to operate normally,
in response to the application being set to a second state, reduce a number of times the application operates during a predetermined time period, and
in response to the application being set to a third state, prohibit at least one operation of the application.

2. The electronic device of claim 1, wherein the processor is further configured to include on the first application list at least one of:
an application that provides a push service,
an application set to perform an operation during a time period,
an application to not be used during a time period,
an application for which a user response to a notification associated with the application is within a probability range, or an application for which there is no user response to a notification associated with the application during a time period.

3. The electronic device of claim 1, further comprising a display,
wherein the operation of the application comprises:
a first operation performed while information corresponding to the operation of the application is displayed on the display;
a second operation performed while the information corresponding to the operation of the application is not displayed on the display; and
a third operation for providing information associated with the application to another application according to a request of the another application,
wherein the processor is further configured to determine whether to use the application according to at least one of the first operation, the second operation, or the third operation.

4. The electronic device of claim 3, wherein the processor is further configured to provide a respective weight value to each of the first operation, the second operation, and the third operation, and to determine whether to use the application based on the weight values.

5. The electronic device of claim 1, wherein the processor is further configured to change the set state of the application according to a user input and to limit the operation of the application according to the changed state of the application.

6. The electronic device of claim 1, further comprising a display,
wherein the processor is further configured to limit the operation of the application, if at least part of the display is inactivated.

7. The electronic device of claim 1, wherein the processor is further configured to limit the operation of the application according to at least one of:
a current time,
a current position of the electronic device,
a remaining capacity of a battery of the electronic device, or
cellular data usage.

8. The electronic device of claim 1, further comprising a communication module configured to communicate with an external electronic device,
wherein the processor is further configured to:
receive a second application list including an application installed in the external electronic device from the external electronic device,
compare the first application list with the second application list, and
limit an operation of an application that performs a same function in one of the electronic device and the external electronic device, if the application that performs the same function is identified from comparing the first application list with the second application list.

9. The electronic device of claim 8, wherein the processor is further configured to transmit a command for limiting the operation of the application installed in the external electronic device, to the external electronic device through the communication module, if the processor is set to limit the operation of the application installed in the external electronic device.

10. A method of application control by an electronic device, the method comprising:
updating a first application list including one or more applications installed in the electronic device, by determining a probability that a user will verify a notification associated with an application and adding the application to the first application list if the application has a probability within a predetermined probability range; and
limiting an operation of the application based at least on the first application list,
wherein limiting the operation of the application comprises:
setting a state of the application included in the first application list,
in response to the application being set to a first state, permitting the application to operate normally,
in response to the application being set to a second state, reducing a number of times the application operates during a predetermined time period, and
in response to the application being set to a third state, prohibiting at least one operation of the application.

11. The method of claim 10, wherein updating the first application list comprises including on the first application list at least one of:
an application that provides a push service,
an application set to perform an operation during a time period,
an application to not be used during a time period,
an application for which a user response to a notification associated with the application is within a probability range, or
an application for which there is no user response to a notification associated with the application during a time period.

12. The method of claim 10, wherein the operation of the application comprises:
a first operation performed while information corresponding to the operation of the application is displayed on a display;
a second operation performed while the information corresponding to the operation of the application is not displayed on the display; and
a third operation for providing information associated with the application to another application according to a request of the another application,
wherein updating of the first application list comprises determining whether to use the application, according to at least one of the first operation, the second operation, or the third operation.

13. The method of claim 12, wherein determining whether to use the application comprises:
providing respective weight values to each of the first operation, the second operation, and the third operation; and
determining whether to use the application based on the weight values.

14. The method of claim 10, wherein limiting the operation of the application further comprises:
changing the set state of the application according to a user input; and
limiting the operation of the application according to the changed state of the application.

15. The method of claim 10, wherein limiting the operation of the application comprises limiting the operation of the application according to at least one of whether a display is inactivated, a current time, a current position of the electronic device, a remaining capacity of a battery of the electronic device, or cellular data usage.

16. The method of claim 10, further comprising:
receiving, from an external electronic device, a second application list including an application installed in the external electronic device;
determining whether there is an application that performs a same function by comparing the first application list with the second application list; and
limiting an operation of the application that performs the same function in one of the electronic device and the external electronic device, based on the comparing of the first application list with the second application list.

17. An electronic device comprising:
a display;
a wireless communication circuit;
a volatile memory;
a processor; and
a non-volatile memory that stores software implementing an operating system (OS) and instructions, which when executed, control the processor to:
load and execute at least part of the OS on the volatile memory,
load and execute an application, which interfaces with the OS, on the volatile memory,
monitor an operation of the executed application by an operation of part of the OS,
unload at least part of the application from the volatile memory, when the display is turned off and the electronic device is on, according to at least part of the monitored result by the operation of part of the OS,
determine whether an event, which is generated by an external device and not generated by an application installed in the electronic device, associated with the unloaded at least part of the application, occurs, and
if the event occurs, re-load and re-execute the unloaded at least part of the application, and unload the re-loaded application again from the volatile memory, after re-executing the applications.

18. The electronic device of claim 17, wherein the instructions control the processor to:
monitor at least one of frequency in execution of the executed application, a time, or a degree of use by a user, by the operation of part of the OS, and
unload the application from the volatile memory, after a time elapses after the display is turned off, if at least one of the frequency in the execution of the application, the time, or the degree of use by the user is less than a selected threshold.

19. The electronic device of claim 18, wherein the instructions control the processor to receive a signal associated with the application through the communication circuit, after unloading the application from the volatile memory, and to refrain from executing the application, despite receiving the signal.

20. The electronic device of claim 18, wherein the instructions control the processor to:
classify the application as one of a plurality of categories according to at least one of the frequency in the execution of the application, the time, the degree of use by the user, or a user input,
store information about the classification in the non-volatile memory, and
limit execution of the application according to at least part of the stored information about the classification, to control execution of the application according to the monitoring, or to permit execution of the application irrespective of the monitoring.

21. The electronic device of claim 17, wherein the instructions control the processor to:
store information associated with the unloaded application in the non-volatile memory, and
display a user interface, which displays at least part of the information stored in the non-volatile memory, on the display.

22. The electronic device of claim 21, wherein the instructions control the processor to:
receive an input about the application through the user interface,
exclude the operation of the application from a monitored target according to at least part of the input, or
not unload the application from the volatile memory irrespective of the monitored result.

* * * * *